United States Patent [19]

Rosenbrock

[11] Patent Number: 6,081,224
[45] Date of Patent: *Jun. 27, 2000

[54] HIGH ACCURACY, LOW SPEED DOPPLER EFFECT RADAR AND SIGNAL CONDITIONING CIRCUIT USEFUL IN AGRICULTURAL APPLICATIONS

[75] Inventor: Richard Rosenbrock, Bluffton, Ind.

[73] Assignee: Parker Hannifin Corporation, Cleveland, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/677,474

[22] Filed: Jul. 10, 1996

Related U.S. Application Data

[62] Division of application No. 08/388,214, Feb. 13, 1995, Pat. No. 5,598,794.

[51] Int. Cl.[7] ........................................ G01S 13/60
[52] U.S. Cl. ........................ 342/104; 342/99; 342/103; 342/61
[58] Field of Search .................. 342/104, 61, 73, 342/89, 91, 92, 94, 99, 100, 101, 102, 103, 114, 115, 195

[56] References Cited

U.S. PATENT DOCUMENTS

| | | | |
|---|---|---|---|
| 3,723,989 | 3/1973 | Fathauer et al. | 340/259 |
| 3,776,642 | 12/1973 | Anson et al. | 356/188 |
| 3,795,893 | 3/1974 | Kritz et al. | 367/91 |
| 3,828,173 | 8/1974 | Knepler | 235/151.35 |
| 3,855,953 | 12/1974 | Fathauer et al. | 111/1 |
| 3,895,384 | 7/1975 | Fathauer et al. | 343/9 |
| 3,912,121 | 10/1975 | Steffen | 221/13 |
| 3,927,400 | 12/1975 | Knepler | 340/276 |
| 3,928,751 | 12/1975 | Fathauer | 235/92 |
| 3,974,377 | 8/1976 | Steffen | 250/222 R |
| 4,009,799 | 3/1977 | Fathauer | 221/3 |
| 4,023,020 | 5/1977 | Lestradet | 235/151.2 |
| 4,052,722 | 10/1977 | Millard | 342/115 |
| 4,085,862 | 4/1978 | Steffen | 221/8 |
| 4,122,974 | 10/1978 | Harbert et al. | 221/13 |
| 4,131,891 | 12/1978 | Stavis | 342/461 |
| 4,149,163 | 4/1979 | Fathauer | 340/684 |
| 4,150,377 | 4/1979 | Milov et al. | 342/125 |

(List continued on next page.)

FOREIGN PATENT DOCUMENTS

| | | | |
|---|---|---|---|
| 59-103169 | 6/1984 | Japan | G06F 15/332 |
| 62-98405 | 5/1987 | Japan | G05D 1/02 |

OTHER PUBLICATIONS

International Search Report mailed May 1, 1996.
Bertelli Bros. Mfg., Inc., Feb. 10, 1995 Letter.

*Primary Examiner*—John B. Sotomayor
*Attorney, Agent, or Firm*—Roper & Quigg

[57] ABSTRACT

A control system for a mobile planting apparatus which permits discrete plant spacing to be determined and maintained independent of wheel rotation on the planting apparatus having: (1) a ground speed sensor wherein the rate of movement relative to the ground is determined independent of wheel rotation of the planting apparatus; (2) an input/display device for inputting desired plant spacing; (3) a variable speed motor for driving seed metering devices on the planting apparatus at varying rates independent of wheel rotation of the planting apparatus, wherein the motor changes speeds in response to an electronic signal; (4) a programmable control circuit communicating electronically with the input/display device and ground speed sensor, wherein the programmable control circuit: (a) determines the number of seeds to be dispensed per unit distance based on the desired spacing received from the input/display device; (b) determines the distance traveled based on electronic signals from the ground speed sensor; and (c) determines the rate at which the variable speed motor should operate in order to achieve the desired plant spacing, and sends an electronic signal to the variable speed motor to effect the desired plant spacing.

6 Claims, 22 Drawing Sheets

U.S. PATENT DOCUMENTS

| | | | |
|---|---|---|---|
| 4,158,202 | 6/1979 | Hubka et al. | 342/115 |
| 4,163,507 | 8/1979 | Bell | 221/2 |
| 4,205,314 | 5/1980 | Strauch | 342/87 |
| 4,225,930 | 9/1980 | Steffen | 364/555 |
| 4,231,039 | 10/1980 | Fritzlen et al. | 342/116 |
| 4,236,140 | 11/1980 | Aker et al. | 342/115 |
| 4,239,010 | 12/1980 | Amburn | 111/1 |
| 4,246,469 | 1/1981 | Merlo | 235/92 PK |
| 4,253,766 | 3/1981 | Funk | 356/418 |
| 4,277,833 | 7/1981 | Steffen | 364/555 |
| 4,333,096 | 6/1982 | Jenkins et al. | 340/684 |
| 4,369,895 | 1/1983 | McCarty et al. | 221/3 |
| 4,401,909 | 8/1983 | Gorsek | 310/323 |
| 4,419,654 | 12/1983 | Funk | 340/52 |
| 4,491,241 | 1/1985 | Knepler et al. | 221/3 |
| 4,523,280 | 6/1985 | Bachman | 364/424 |
| 4,555,624 | 11/1985 | Steffen | 250/223 R |
| 4,630,773 | 12/1986 | Ortlip | 239/1 |
| 4,633,252 | 12/1986 | Bachman et al. | 342/99 |
| 4,713,665 | 12/1987 | Phelan | 342/104 |
| 4,728,954 | 3/1988 | Phelan et al. | 342/115 |
| 4,775,867 | 10/1988 | Sokol et al. | 343/713 |
| 4,782,282 | 11/1988 | Bachman | 324/61 R |
| 4,803,626 | 2/1989 | Bachman et al. | 364/424.07 |
| 4,920,345 | 4/1990 | Lissel et al. | 342/70 |
| 4,924,418 | 5/1990 | Bachman et al. | 364/550 |
| 4,928,607 | 5/1990 | Luigi | 111/185 |
| 5,025,951 | 6/1991 | Hook et al. | 221/13 |
| 5,220,876 | 6/1993 | Monson et al. | 111/130 |
| 5,260,875 | 11/1993 | Tofte et al. | 364/424.07 |
| 5,323,721 | 6/1994 | Tofte et al. | 111/200 |
| 5,339,075 | 8/1994 | Abst et al. | 340/903 |
| 5,598,794 | 2/1997 | Harms et al. | 111/77 |

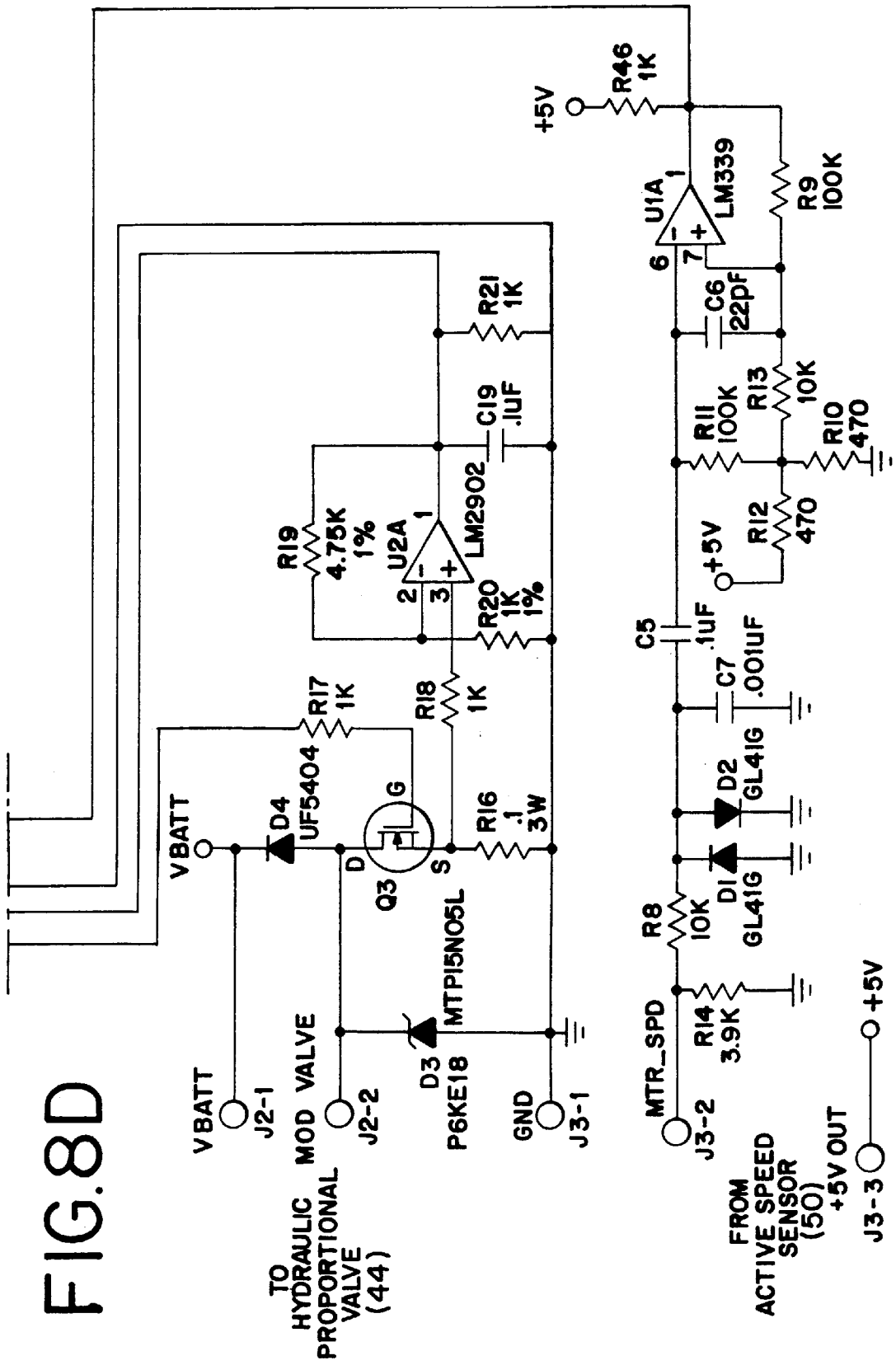

EVENT DRIVEN BACKGROUND TASKS (INTERRUPTS)

HIGH ACCURACY, LOW SPEED DOPPLER EFFECT RADAR AND SIGNAL CONDITIONING CIRCUIT USEFUL IN AGRICULTURAL APPLICATIONS

This application is a divisional application of U.S. Ser. No. 08/388,214 filed on Feb. 13, 1995, now U.S. Pat. No. 5,598,794.

BACKGROUND OF THE INVENTION

This invention relates generally to a planting apparatus, and more particularly to a planting apparatus wherein the preselected linear seed or plant spacing in the growing medium (hereinafter the "field") is adjustable while the planting apparatus is in motion, and is accurately determined and delivered to the field irrespective of any wheel slippage or sliding by the planting apparatus that ordinarily occurs in planting operations.

Farming is a highly labor intensive and cost driven activity, and the farming industry is constantly striving to decrease farm labor, decrease related farm costs, and increase farm yields (often measured on a yield per area, such as on a yield per acre basis). As a consequence, present day farming techniques employ, among other things, the automated planting or transplanting (collectively "planting") of crops.

Present day automated planting is ordinarily accomplished by having a moving vehicle (hereinafter "tractor") pull a planting apparatus having one or more seed or plant dispensing devices (collectively "seed dispensers") across a field. The seed dispensers are often arranged in one or more rows on the frame of the planting apparatus, and the rows on the frame are oriented transversely to the direction of travel by the tractor. The seed dispensers are ordinarily arranged at distances corresponding to the width of furrows in the portion field to be planted by the planting apparatus.

The rate at which seeds or plants (collectively "seeds") are dispensed by the seed dispensers is generally determined by a drive mechanism which operates a seed metering apparatus, such as a rotating seed dispensing disc, which has a discrete number of holes or pockets ("holes") which in turn dispense a discrete number of seeds per revolution of the drive mechanism or seed metering device. The drive mechanism, in turn, typically is rotatably connected to a free-rolling wheel, for example, via a power transmission system such as gears, chains and sprockets, or pulleys. The free-rolling wheel is typically mounted on an axle connected to the frame of the planting apparatus on which the seed dispensers are mounted. Other means of directly or indirectly driving a seed metering device directly or indirectly off of a free-rolling wheel are known in the art as well, and will not be discussed herein in detail.

The rate at which seeds are dispensed may be and often is determined by manually adjusting the drive mechanism connection (such as a gear or chain and sprocket ratio adjustment), which in turn determines the rate of revolution of the drive mechanism, and, as a result, the seed dispensing disc, per revolution of the free-rolling wheel. By manually adjusting the drive mechanism connection, the operator can determine the number of seeds to be delivered per linear distance travelled by the planting apparatus, assuming a substantially pure rolling motion (i.e., absolutely no slippage or sliding) by the free-rolling wheel of the planting apparatus.

In order to economically obtain the maximum crop yield per acre while minimizing costs from, for example, seed waste from planting more seeds than a particular portion of the field will have nutrients to support, the operator of the planting apparatus (hereinafter "farmer") must be able to accurately control and accurately adjust (preferably while the planting apparatus is in motion) the number of seeds planted per linear distance of travel by the planting apparatus.

It has been determined that different portions of a field being planted by a farmer may vary widely in ability to supply nutrients to support a crop; i.e., a farmer's field may have a wide spectrum of high yield, medium yield, and low yield areas scattered throughout the acreage to be farmed. Ideally, a farmer would like to accurately plant seeds closer together linearly in a high yield area, and farther apart linearly in a low yield area, and to be able to do so without stopping the planting apparatus and, e.g., dismantling and readjusting the drive mechanism each time the planting apparatus travels from high to medium to low yield areas of a particular field. Because of the farmer's inability with many prior art planting devices to accurately vary linear seed spacing without the time-consuming and labor intensive practice of stopping and adjusting, e.g., the drive mechanism for the seed dispensers, farmers often set the linear plant spacing at a predetermined constant rate (sometimes referred to as an "average rate") for the field. This practice resulted in (1) lower than optimum crop yield in high yield areas of the field due to underplanting, or (2) overplanting (resulting in seed waste) in low yield areas of the field, or (3) both. These outcomes had adverse economic impacts on the farmer.

In order to optimize crop yield by accurately dispensing seeds at predetermined linear spacings, a farmer would prefer to be able to accurately control the distance between seeds. For example, when planting corn, farmers may prefer the nominal linear distance between seeds in a medium yield portion of the field to be 8.0 inches, in high yield portions to be 6.0 inches, and in low yield portions to be 12.0 inches. The farmer might prefer a wide spectrum of other spacings to be available as well, depending upon, among other things, soil conditions. Consequently, a farmer would prefer to be able to accurately control nominal linear seed spacing within increments of 0.125 inches or less in such applications. The nominal spacing and increments may, of course, vary, depending upon, among other things, the crop.

Prior art automated planting apparatus in which the seed dispensing rate depended upon a drive mechanism coupled to a free-rolling wheel of the planting apparatus lacked the ability to control linear seed spacing with the accuracy desired. This is due, in part, to the fact that in ordinary farming conditions the free-rolling wheel connected to the drive mechanism of the planting apparatus does not operate with a pure rolling motion, and unless the free-rolling wheel connected to the drive mechanism purely rolls, seeds are dispensed at a rate that will not accurately and consistently achieve the desired spacing per linear distance travelled by the planting apparatus.

For example, in the crumbling topsoil typically encountered in many farming applications, the free-rolling wheel of the planting apparatus pulled by the tractor may slide intermittently and at unpredictable intervals. When the wheel slides instead of rolls, the rotating drive mechanism connected to the aforesaid wheel which operates the seed dispenser will not drive the seed dispenser (or will drive it at a slower rate than if it were purely rolling) which results in less seeds being dispensed than desired per linear distance travelled by the planting apparatus. This is because the planting apparatus may travel forward despite the nonrotation of the free-rolling wheel as a result of the sliding mode of travel. Similarly, as the free-rolling wheel encounters crumbling topsoil beneath it, the wheel may over-rotate, or slip (i.e., although the wheel rotates, the planting apparatus does not move relative to the ground, similar to an automobile spinning its wheels in the snow), resulting in the seed dispenser dispensing seeds at a rate greater than that desired per linear distance travelled by the planting apparatus.

SUMMARY OF THE INVENTION

Accordingly, it is an object of this invention to provide a new and improved planting apparatus that enables a farmer to accurately preselect and adjust linear seed spacing to be delivered to the field without the need to stop or manually adjust the drive mechanism connection to the seed dispensers.

Another object of this invention is to provide a planting apparatus that dispenses seeds at a rate determined independently of wheel rotation of the planting apparatus or the tractor, thus alleviating any inaccuracies in linear seed spacing inherent in prior art systems as a result of wheel sliding or slippage.

Another object of the invention is to provide a planting apparatus with a speed or distance sensing device that is highly accurate as compared to those previously available in the art, as a result of the combination of a low-speed Doppler effect radar unit and a signal conditioning circuit which "locks" on desired signals and filters out unwanted signals that ordinarily limit the accuracy of low-speed Doppler effect radars in low speed applications.

Still another object of this invention is to provide a readily operable planting apparatus wherein linear seed spacing can be controlled and monitored during operation from a remote location, such as from the seat or cab of a tractor, via a display unit without resort to manual manipulation of the seed dispensers, the drive mechanism, the gearing for the drive mechanism, or other related components for the planting apparatus.

Yet another object of the invention is to provide a new and improved planting apparatus that has the capability of accurately controlling or regulating linear seed spacing to within 0.125 inches or less in appropriate applications.

A further object of this invention is to provide a new and improved planting apparatus which achieves the foregoing and other objects readily discernable to one skilled in the art, and which is readily operable, efficient, and reliable in operation from the farmer's standpoint.

The present invention alleviates problems associated with prior art planting apparatus by, among other things, determining linear seed spacing independently of the rotation of the free-rolling wheel of the planting apparatus. The invention does so by, other things, (1) accurately determining the speed or distance of travel of the planting apparatus relative to the field independently of the rotational speed of the aforesaid wheel; and (2) utilizing a drive mechanism for the seed metering devices within the seed dispenser which is operable independent of the rotational speed of the aforesaid wheel. In the embodiment of the invention described herein (1) the speed of the planting apparatus relative to the field is determined by a low speed capability Doppler effect radar unit (hereinafter "low speed radar") such as that manufactured by Entra Corporation, model number LR100 (or other devices that similarly are capable of sensing vehicle speed or distance travelled relative to the ground, independent of wheel rotation) coupled with a signal conditioning circuit that filters out unwanted signals so as to provide a highly accurate low speed sensitive radar signal; and (2) the driving mechanism for the seed metering device of the seed dispensers is a highly responsive proportionally controlled hydraulic motor circuit that is further controlled and monitored by a feedback mechanism via a programmable control circuit device.

In general terms, the rate of speed or distance travelled is accurately determined by the low speed radar and signal conditioning circuit, and is fed into a programmable control circuit (hereinafter "microprocessor") together with the desired linear seed spacing as selected by the farmer and as ordinarily input by the farmer through an input mechanism such as a display unit located remotely from the planting apparatus, for example, in the vicinity of the cab of the tractor. Those inputs are used by the microprocessor to determine (despite the changing ground speed of the planting apparatus) the desired rate of flow of hydraulic fluid to the hydraulic motor (which, in turn, determines the desired hydraulic motor speed) which, in turn, operates the seed metering devices in the seed dispensers at the appropriate rate so as to dispense seeds at highly precise and consistent intervals heretofore unattainable in prior art devices, all independent of any sliding and slippage that the wheels of the planting apparatus or tractor encounter in the field.

An active speed sensor monitors the rate of operation of the hydraulic motor (or other elements of the device operatively engaged to rotate therewith) and provides that information to the microprocessor which determines whether there is any deviation from the desired rate of operation. If so, the microprocessor sends the appropriate signal to the hydraulic proportional valve to adjust the amount of hydraulic fluid therethrough, and thus refines the speed of the hydraulic motor accordingly.

The linear seed spacing can be varied by the farmer without stopping the planting operation and adjusting, e.g., the drive mechanism, or other mechanical features of the planting apparatus. The farmer may simply input the new desired seed spacing via the display unit and, because of the combined quick response and calculation rate of the microprocessor, the proportional hydraulic valve, the hydraulic motor, and the radar, the resulting spacing of the seeds is changed quickly "on the fly," a highly desirable result.

BRIEF DESCRIPTION OF THE DRAWINGS

FIGS. 8A, 8B, 8C, 8D, and 8E are a schematic diagram of the electrical components of the microprocessor circuit of the described embodiment.

DETAILED DESCRIPTION OF THE ILLUSTRATED EMBODIMENTS

Figure 1:
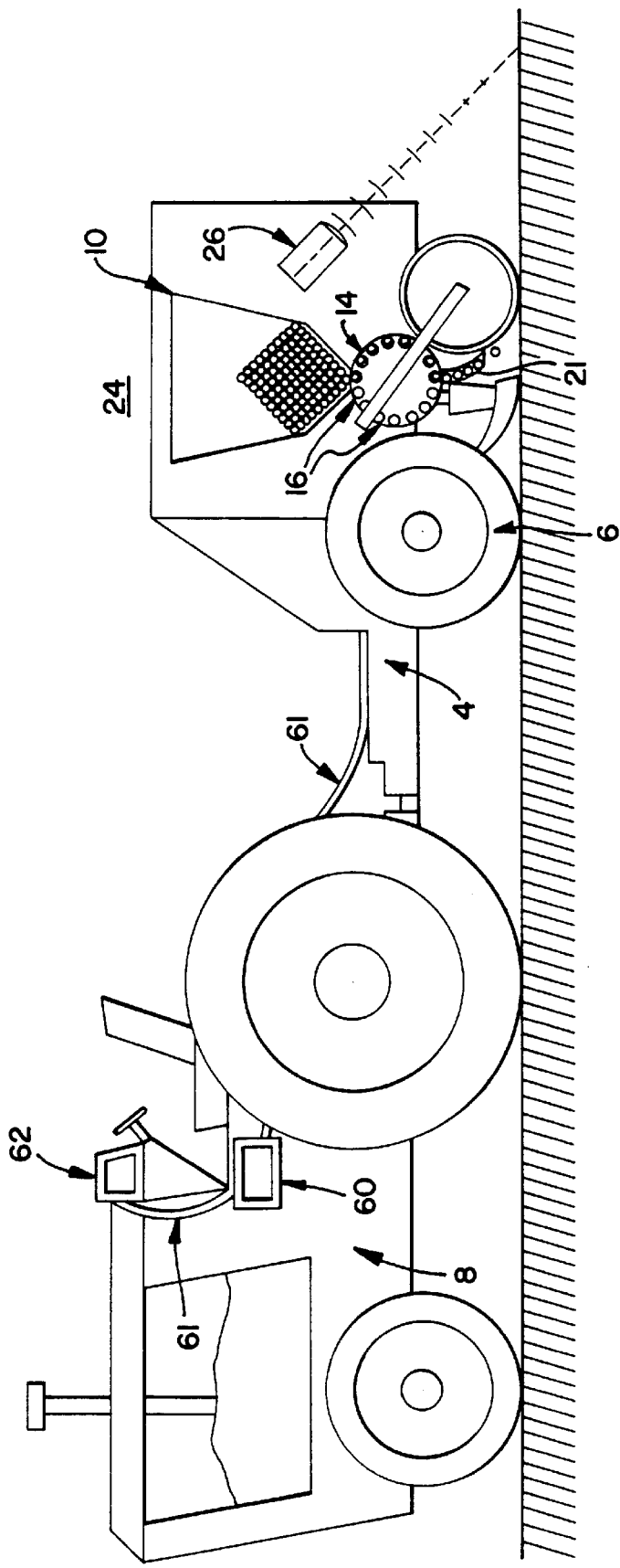
FIG. 1 is a side view of a tractor coupled to the planting apparatus, including a partial cutaway view of the planting apparatus of the described embodiment.
Figure 2:
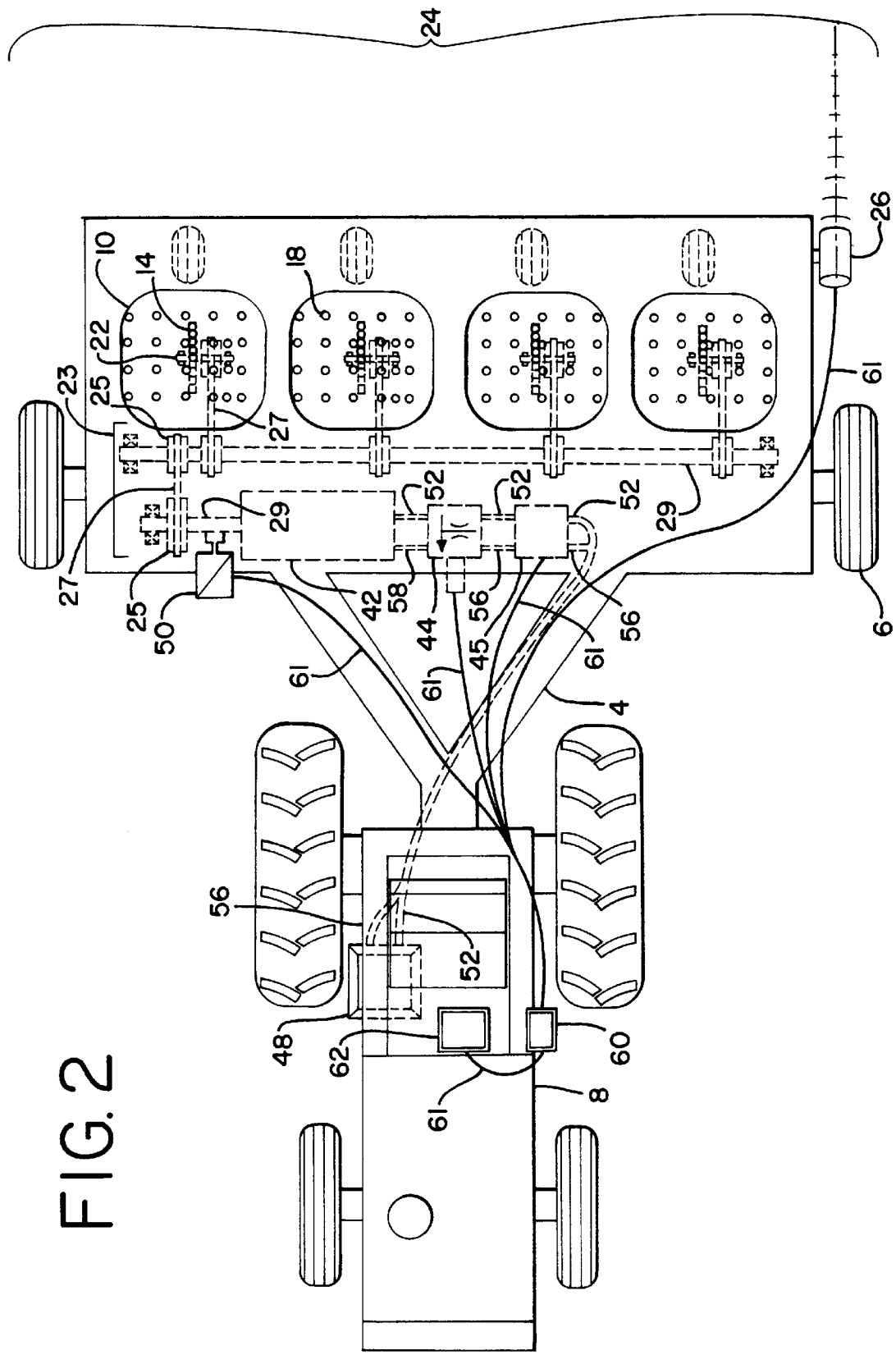
FIG. 2 is a top view of a tractor coupled to the planting apparatus of the described embodiment.
Figure 3:
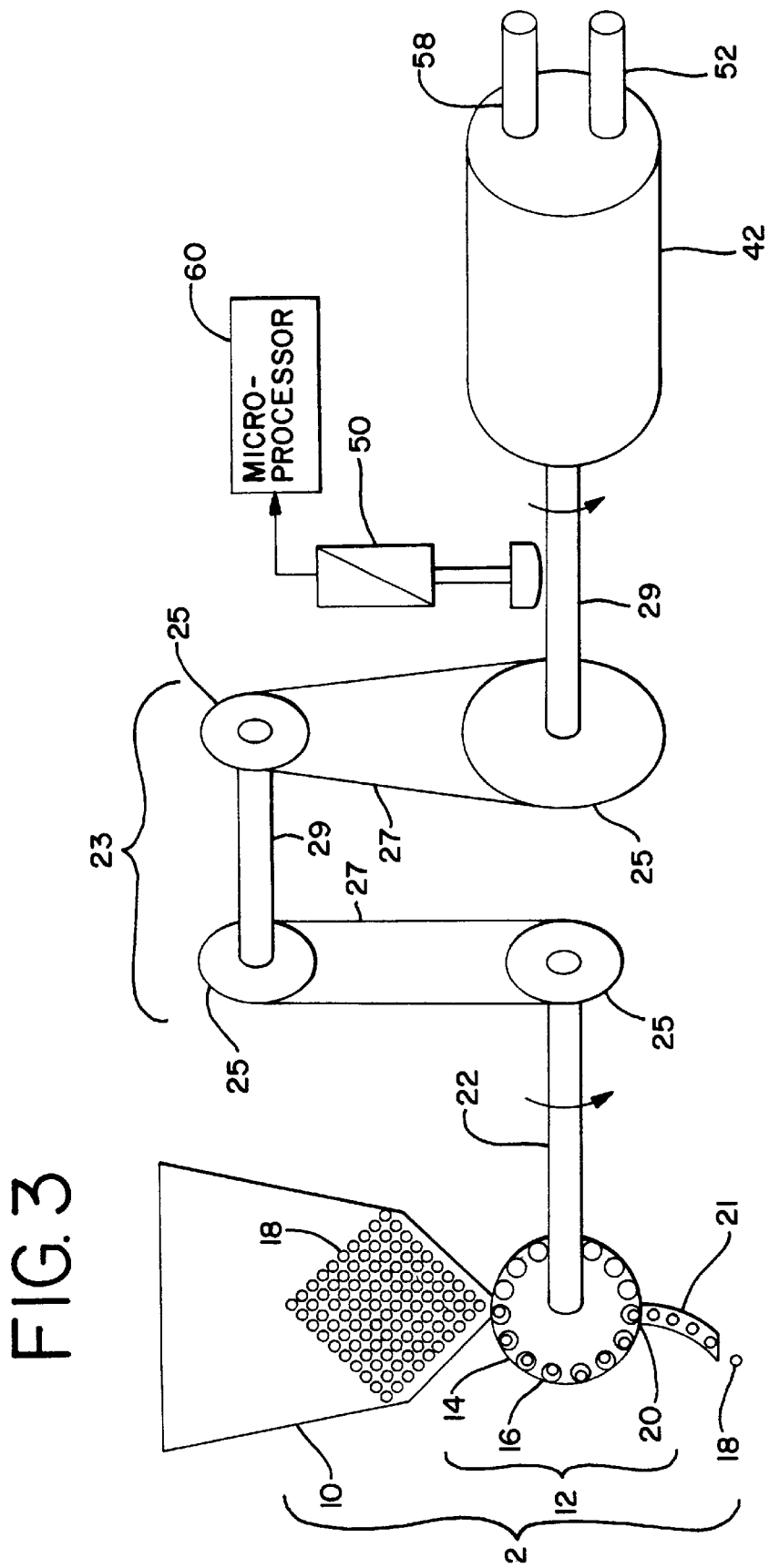
FIG. 3 is an exploded view of a portion of the planting apparatus, including the hydraulic motor, an active speed sensor, a single transmission, and a single seed dispenser, including a partial cutaway view of the seed dispenser of the described embodiment.

Referring generally throughout to the Figures, and specifically here to FIGS. 1, 2, and 3, the planting apparatus 24 includes one or more seed dispensers 2 that are located on a frame 4 which, in turn, is typically mounted on free-rolling wheels 6, but can be mounted on any other known means of transporting such frames, for example, on skids (not illustrated). The frame is ordinarily pulled or pushed by a vehicle, typically pulled by a tractor 8. The seed dispensers may be of various known constructions and need not be described in detail. Those skilled in the art will recognize that various seed dispensers may be used in conjunction with the invention without departing from the teachings of the invention.

One common seed dispenser design includes a seed hopper 10, and includes seed metering devices 12 capable of dispensing seeds intermittently. For example, a seed metering device 12 may be a typical device wherein a plurality of seeds 18 are gravity-fed or vacuum-fed into a rotating disc 14 with one or more evenly-spaced holes 16, which are larger than the seed 18 to be planted and which are capable of capturing gravity-fed or vacuum-fed seeds 18, which are then released to the field below when the rotating disc rotates to a position wherein the hole 16 in the disc 14 holding an individual seed 18 aligns itself with the release point 20 above the seed chute 21 of the seed dispenser 2. Thus, it will be recognized that the rate at which seeds are dispensed to the ground below in this exemplary seed dispenser can be adjusted by regulating among other things, the number of holes in the rotating disc 14, or the rotational speed of the disc in the seed metering device 12, or both. Seed monitoring devices or seed counting devices of known construction (not illustrated) may be included in the seed dispensers to detect, for example, jamming of or other malfunctions of the seed dispensers, or to further monitor seed dispensing.

Figure 4:
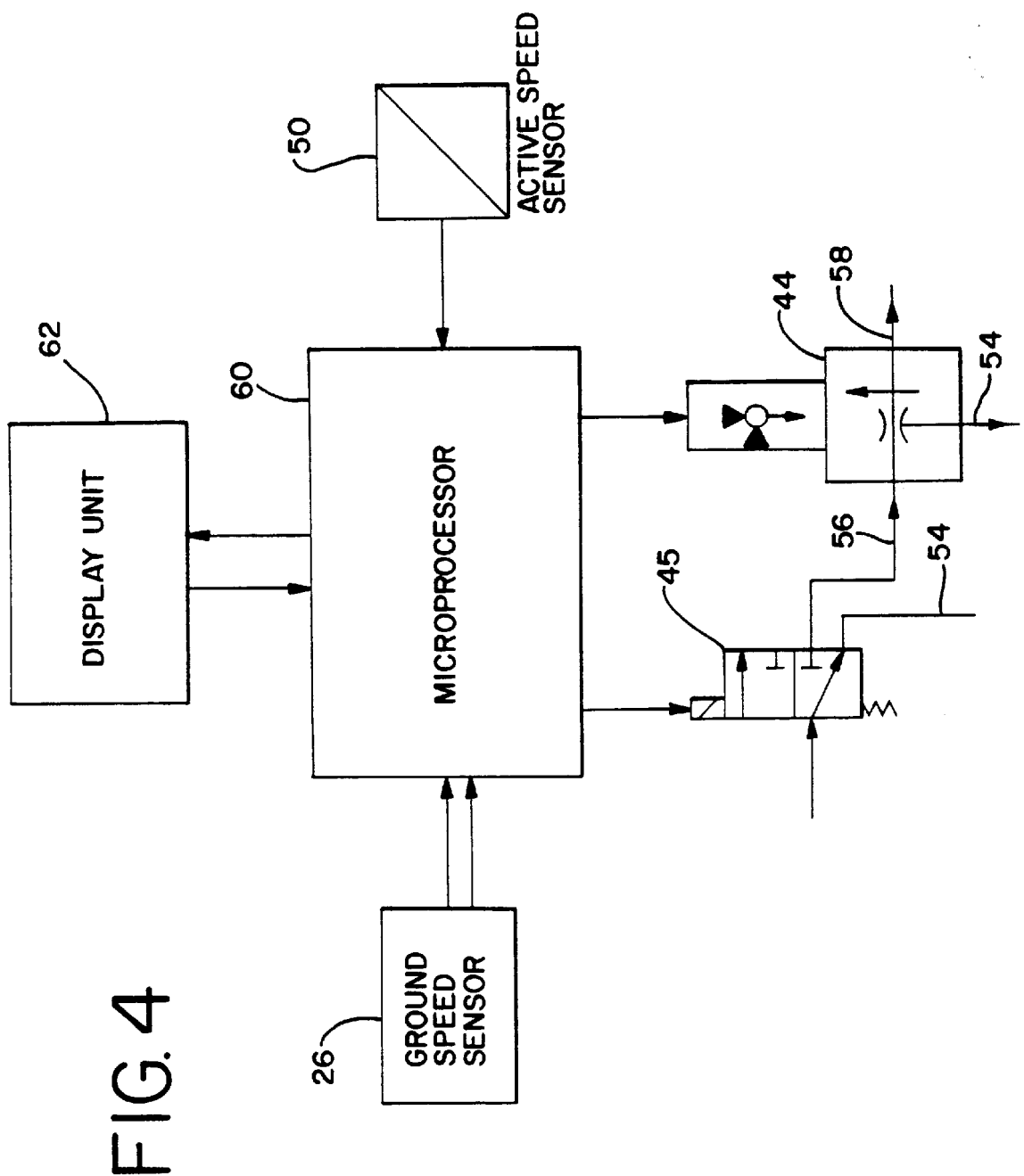
FIG. 4 is a block diagram of the major electrical components of the planting apparatus, illustrating their electrical communication with each other and with the hydraulic safety valve and hydraulic proportional valve, including a partial schematic view of the hydraulic circuit for the described embodiment.
Figure 5:
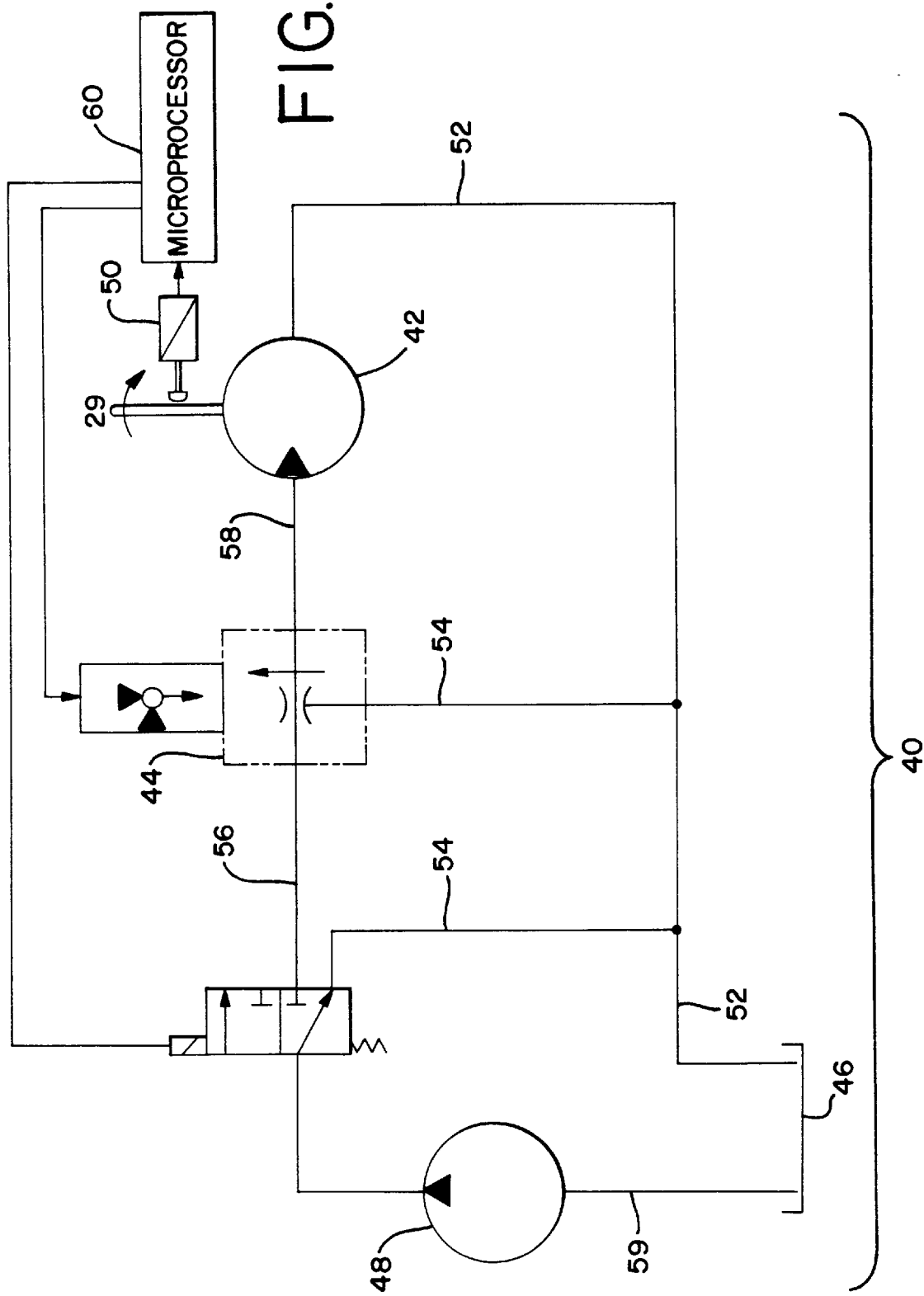
FIG. 5 is a schematic diagram of the hydraulic motor circuit, including the electrical communication between elements of the hydraulic motor circuit and the microprocessor for the described embodiment.

Referring to FIGS. 2, 3, 4, in the described example of one embodiment of the invention, the operating rate of the seed metering devices of the seed dispensers, e.g., the speed of rotation of the discs, may be regulated by a proportionally controlled hydraulic motor 42. While other proportionally controlled motors operable at the direction a microprocessor 60 may be used, the inventors have determined at this time that the relative simplicity, reliability, and quick reaction or response time of a proportionally controlled hydraulic motor 42 having a fast-reacting and accurately controlled hydraulic proportional valve 44 make such a motor and hydraulic motor circuit 40 a desirable choice. In the described embodiment, the hydraulic motor may be a motor such as the R-series motor manufactured by the Char-Lyn division of Eaton Corporation.

A proportionally controlled hydraulic motor circuit 40 useful in carrying out the invention is described below. A hydraulic motor 42 is connected directly or indirectly (e.g., via gears, chain and sprockets, pulleys, or other known power transmission linkages) to the seed metering devices 12 via, for example, a rotatable shaft 22, with the linear rate of dispensing the seeds 18 per unit of distance travelled being a function, in part, of the speed of rotation of the shaft 22 and the number of holes 16 in the rotating discs 14. The rotational speed of the shaft 22 is, in turn, a function of the rotational speed of the hydraulic motor 42. In the illustrated embodiment, the rotational motion of the hydraulic motor 42 is transmitted to the rotatable shaft 22 through a transmission device 23 including a series of shafts 29, sprockets 25, and chains 27 in a manner known to those skilled in the art such that rotation of the hydraulic motor 42 will cause a corresponding rotation at a determinate rate in the rotatable shaft 22 and the rotating disc 14.

The hydraulic motor 42 is connected hydraulically to a fast-reacting and accurately controlled hydraulic proportional valve 44, for example, a hydraulic proportional valve such as the valve sold by Fluid Power Industries as model number 8352105, or as described in U.S. Pat. No. 4,121,610. Such a hydraulic proportional valve 44 is capable of adjusting the rate of flow of hydraulic fluid therethrough very quickly (on the order of 0.150 seconds, or less) in response to an electrical signal; i.e., the proportional valve 44 will quickly adjust to allow more or less hydraulic fluid to pass through to the hydraulic motor in response to an electrical signal. The electrical signal input to the proportional hydraulic valve is received from the microprocessor 60, through electrical lines 61, as will be discussed further herein.

A quantity of hydraulic fluid is supplied to the hydraulic proportional valve 44 via a supply circuit 56. The hydraulic proportional valve 44 determines, depending on the electrical signal arriving from the microprocessor 60 via electrical lines 61 (which proportionally opens or closes the hydraulic proportional valve 44), the amount of hydraulic fluid that will pass therethrough via the operating circuit 58 to the hydraulic motor 42. The rotational speed at which the hydraulic motor 42 operates (which, in turn, helps to determine the rate of dispensing seed) is a function of the amount of flow of hydraulic fluid through the hydraulic motor 42, as determined by the proportional valve 44. After hydraulic fluid passes through the hydraulic motor 42, the hydraulic fluid in the described embodiment flows through a return circuit 52, and may pass to a reservoir 46. Similarly, hydraulic fluid that is not allowed to pass through the proportional valve 44 to the hydraulic motor 42 may be diverted through a diversion circuit 54 to the return circuit 52, and may pass to the reservoir 46. A hydraulic pump 48 is connected hydraulically to pump hydraulic fluid between the reservoir 46 and the proportional valve 44, and may be connected between the reservoir 46 and the supply circuit 56 via a replenishing circuit 59, pumping hydraulic fluid at a relatively constant rate in the described embodiment.

In addition to the hydraulic proportional valve 44, a safety valve 45 may be interposed in the hydraulic circuit between the hydraulic proportional valve 44 and the hydraulic pump 48. The safety valve 45 can take the form of a two-position, three way valve such as that manufactured by Fluid Power Industries as model number MV4-24-12VDC. The placement of the safety valve 45 is such that if the planting apparatus 24 is not in motion as determined by the ground speed sensor 26 and the signal conditioning circuit 102 via the microprocessor 60, the microprocessor 60 sends a signal to cause the safety valve 45 to divert the hydraulic fluid through a diversion circuit 54 (i.e., the hydraulic motor circuit 40 is closed); if, on the other hand, the planting apparatus 24 is in motion, the microprocessor 60 sends a signal to cause the safety valve 45 to direct the hydraulic fluid through (i.e., open) the supply circuit 56. Those skilled in the art will recognize that the safety valve 45 may be omitted, or may be combined with the proportional valve 44 into a single valve without departing from the teachings of the invention.

Referring to FIGS. 1 and 2, a highly-accurate ground speed sensor 26 coupled with a signal conditioning circuit 102 (FIGS. 8A, 8B, 8C, 8D, 8E, 9, and 10) capable of determining the speed of or distance travelled by the planting apparatus 24 relative to the field to be planted and independent of the rotation of the wheels 6 of the planting apparatus 24 (or the wheels 28 of the tractor 8) is connected to the planting apparatus 24 or the tractor 8. In the embodiment illustrated, the ground speed sensor 26 is connected to the planting apparatus 24. As previously noted, the described embodiment of the invention utilizes as a ground speed sensor 26 a low speed radar capable of operating over the preferred operating speed of a planting apparatus 24 (e.g., between 0.10 and 12.0 miles per hour ("mph")), and when coupled with a signal conditioning circuit 102 through a radar pre-amp 101, is capable of determining relative ground speed with high accuracy (preferably within at least 0.01 mph). The ground speed sensor 26 provides periodic input concerning the relative ground speed of or distance travelled by the planting apparatus 24 on an ongoing basis by communicating, preferably electronically, with the microprocessor 60, via the circuitry referenced above.

Figure 6:
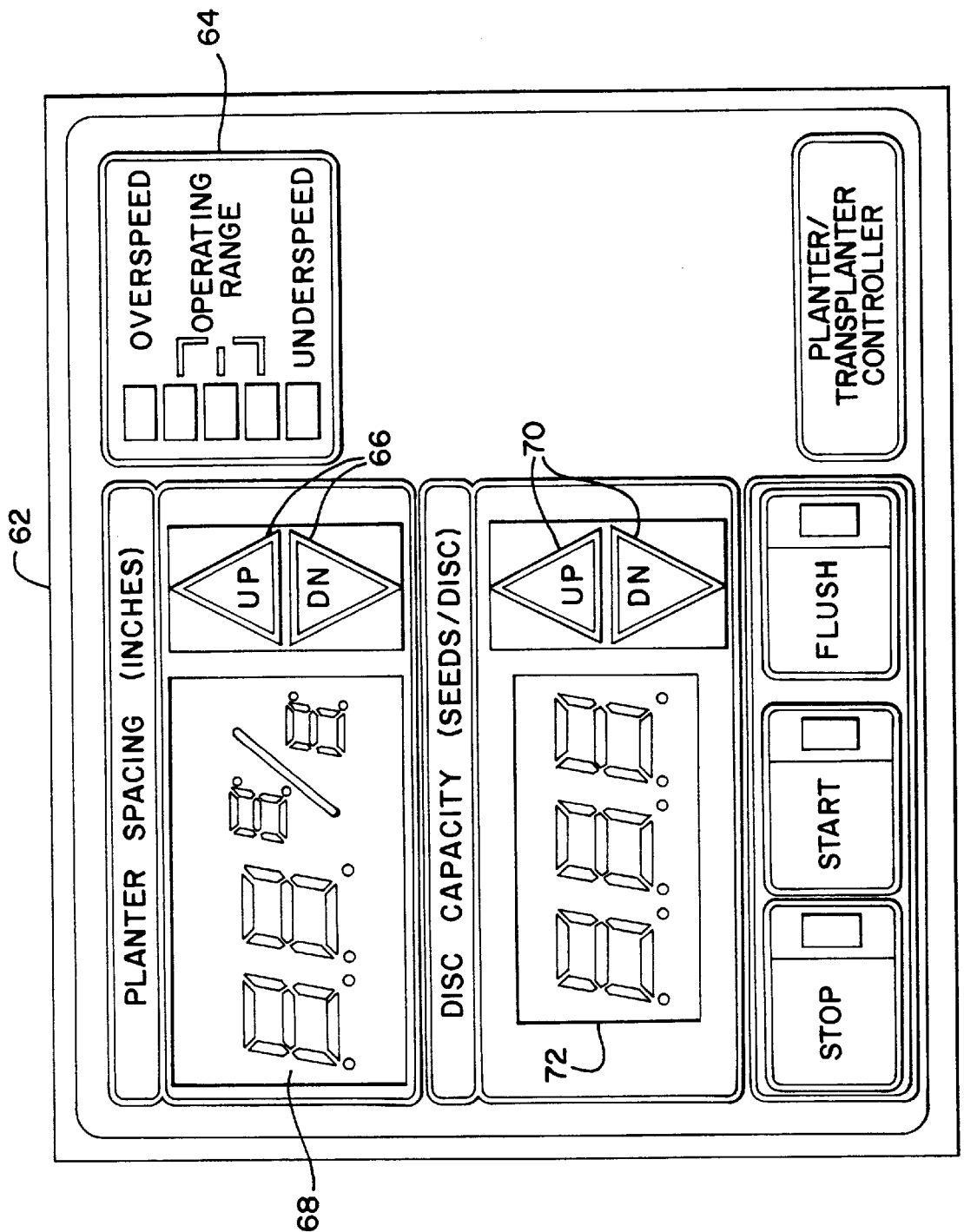
FIG. 6 is a front view of the display unit of the described embodiment.
Figure 7A:
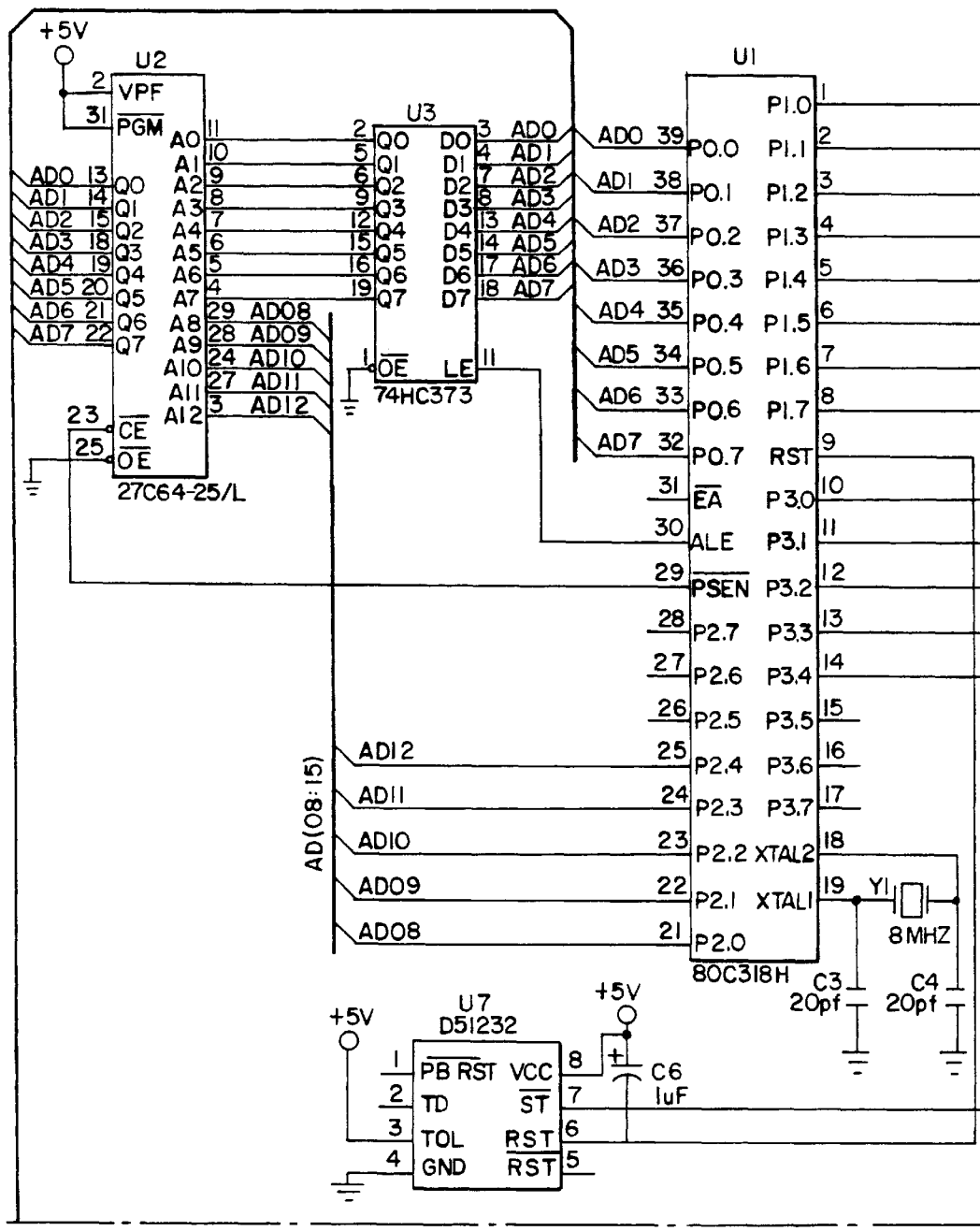
FIGS. 7A, 7B, and 7C are a schematic diagram of the electrical components of the display unit of the described embodiment.
Figure 7B:
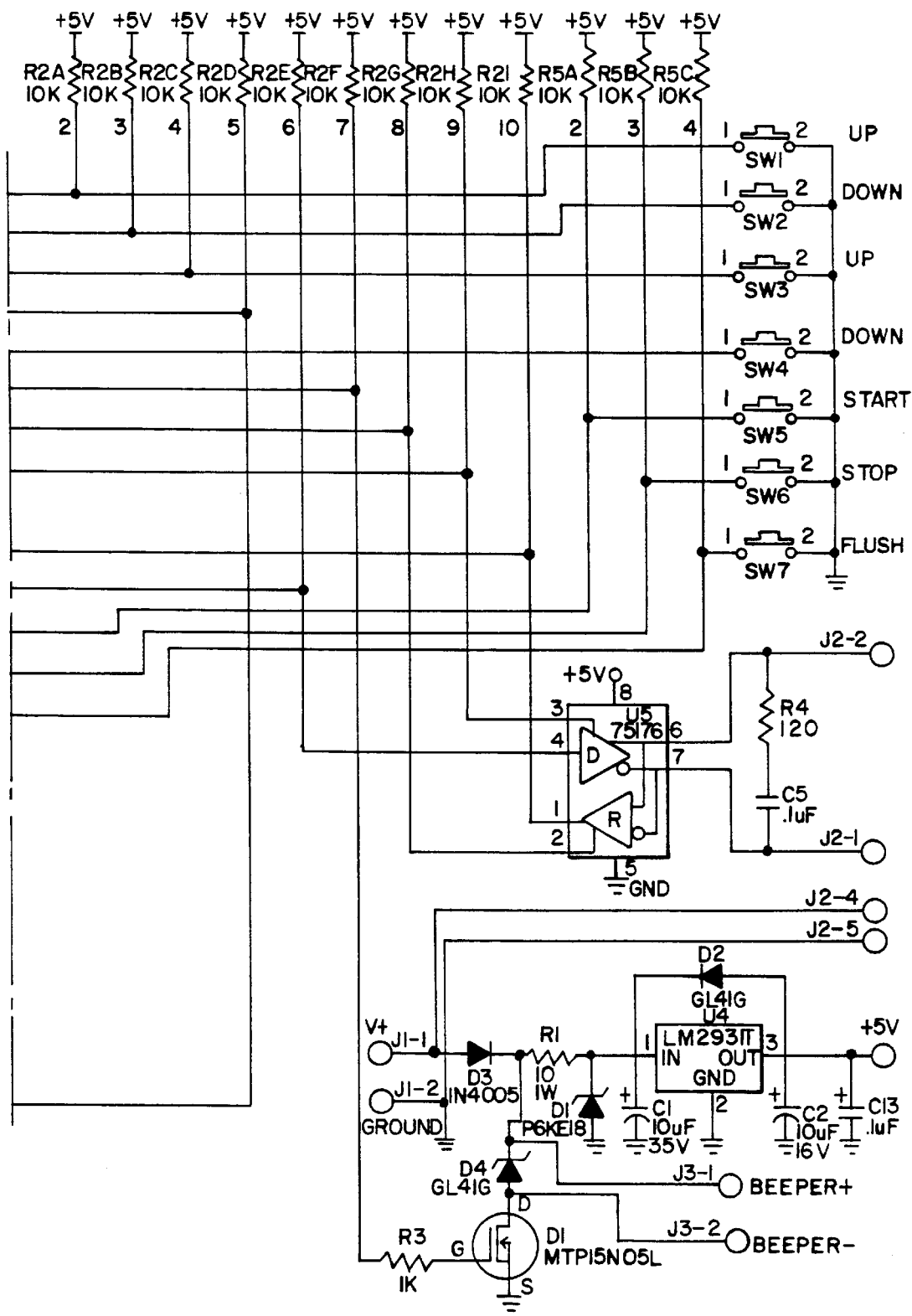
Figure 7C:
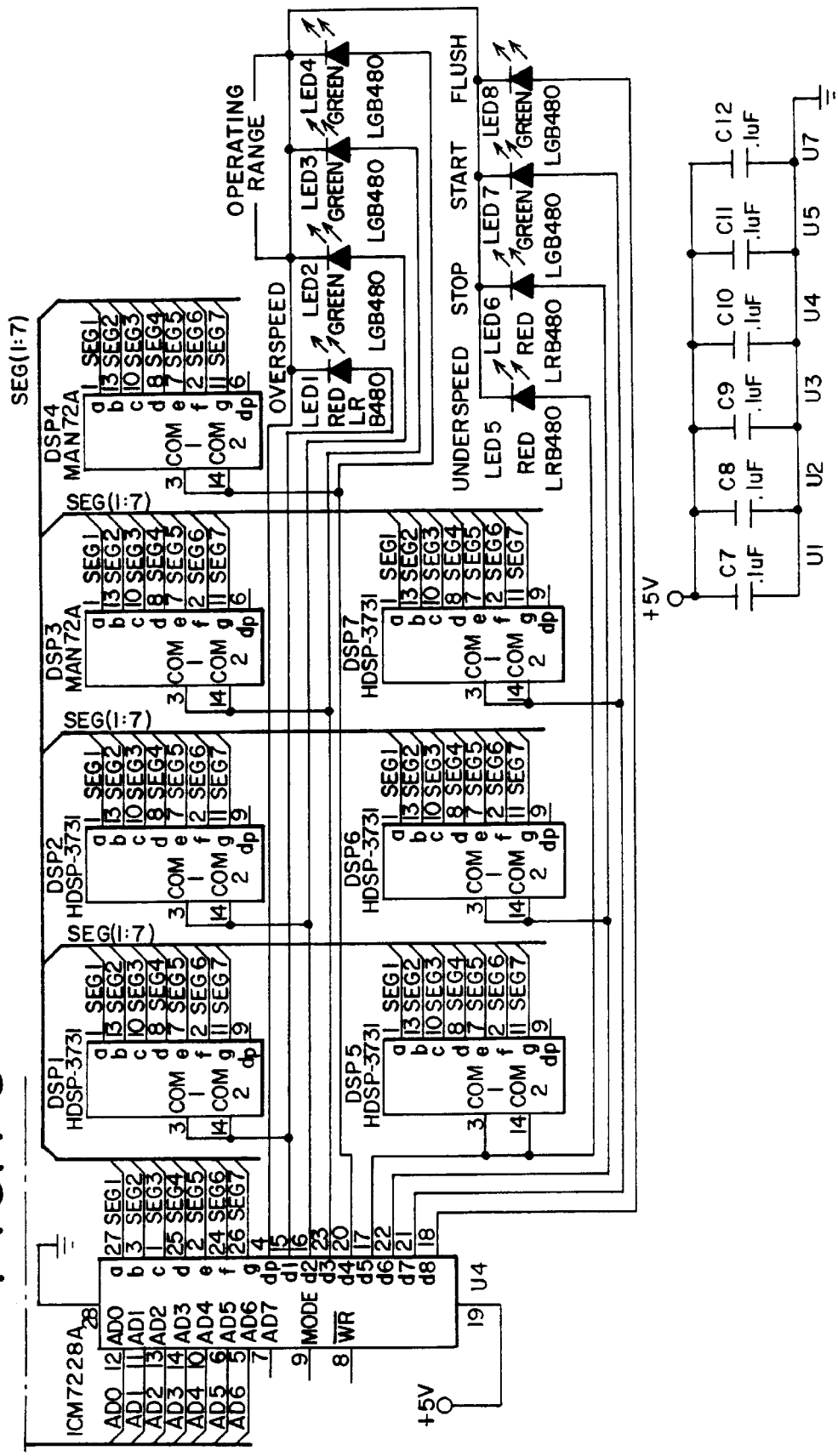
Figure 8A:
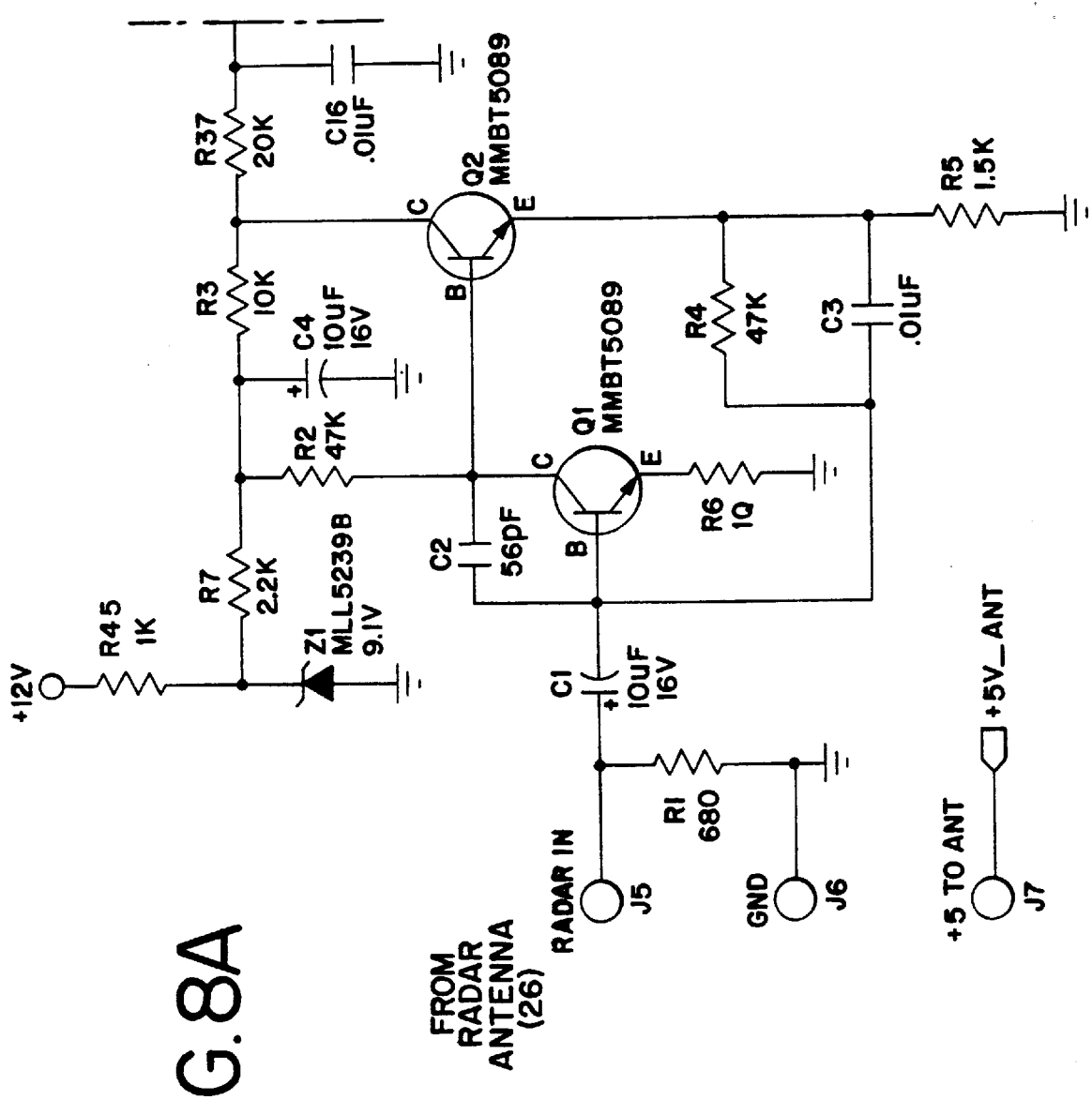
Figure 8B:
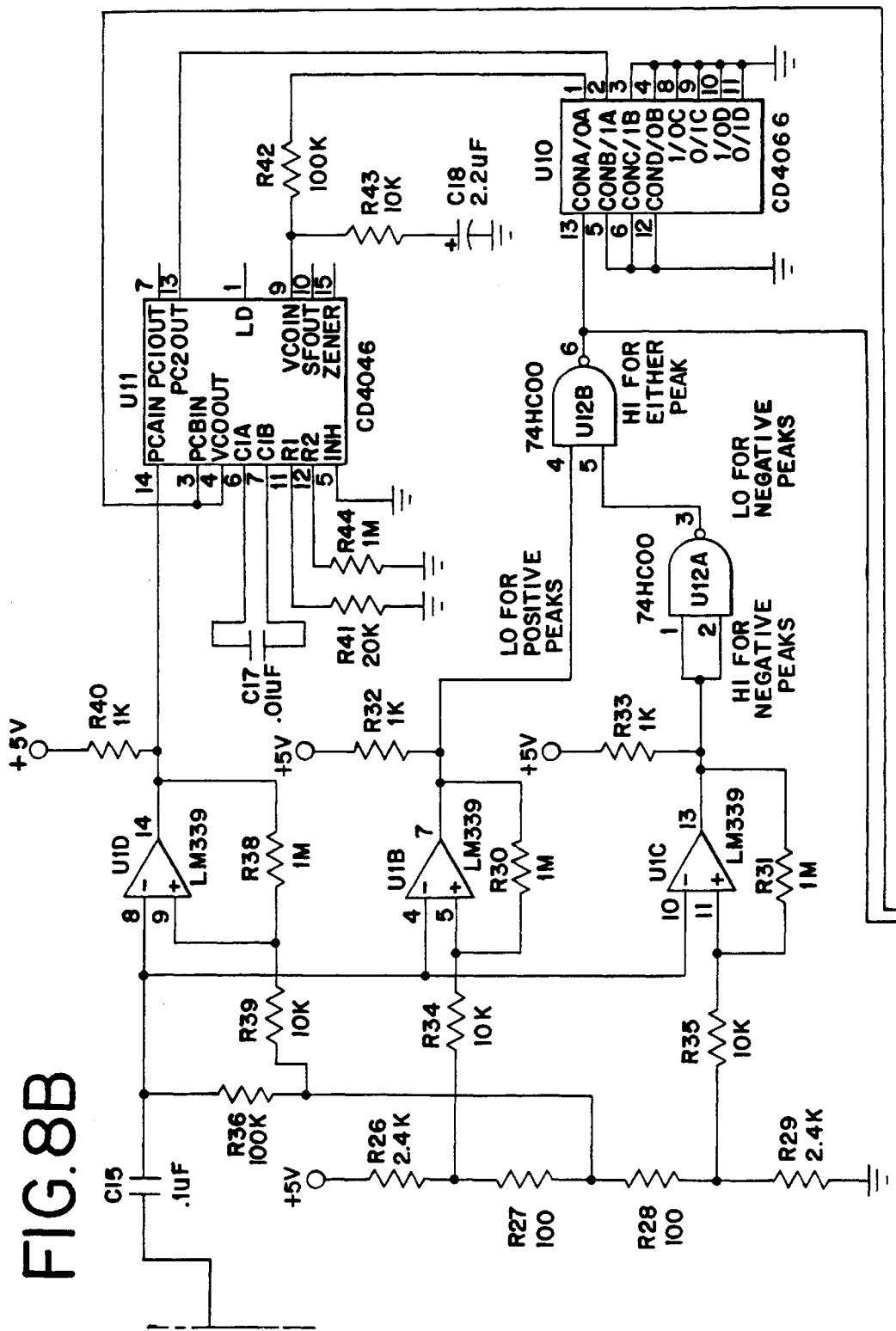
Figure 8C:
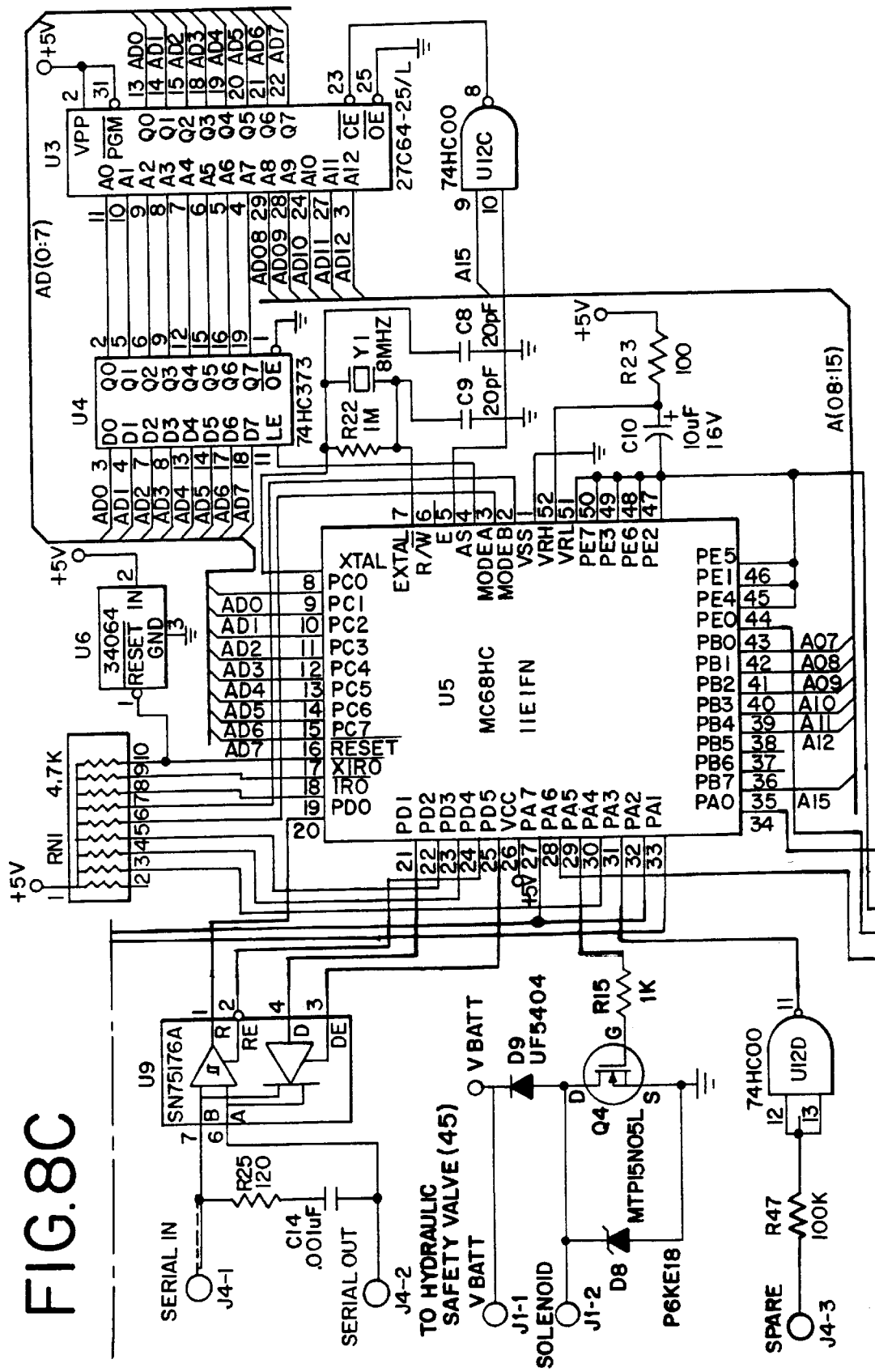
Figure 8E:
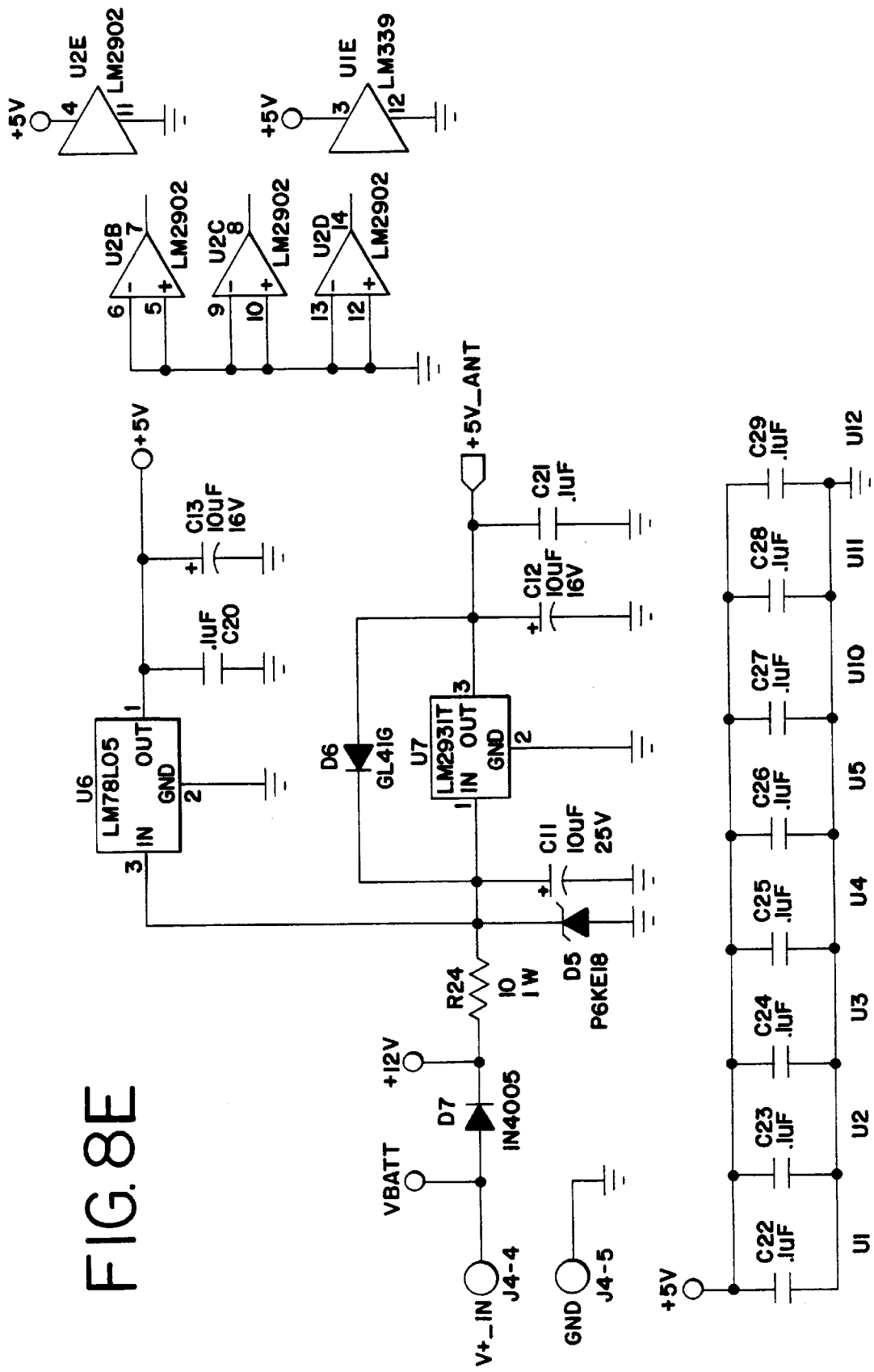

Referring to FIGS. 1, 2, and 6, the described embodiment of the invention also utilizes an input device, such as the display unit 62 shown in the illustrated embodiment, which permits the farmer, for example, to use plant spacing inputs 66 to select (or to change) a desired linear seed spacing of the dispensed seeds 18. The plant spacing selected may be shown on plant spacing display 68. The display unit 62 may also allow the farmer to input other information, such as the number of seeds dispensed per rotation of each individual rotating disc 14 (ordinarily the number of holes 16 in the disc 14) by using disc capacity inputs 70. The disc capacity selected may be shown on disc capacity display 72. The inputs may take the form of electronic switches known in the art, and the displays may take the form of LED's, LCD's or other display means known in the art, and will not be discussed in detail here. The circuitry of the display unit for the described embodiment is shown schematically in FIGS. 7A, 7B, and 7C; however, those skilled in the art will recognize that an input or display unit using circuitry different from that described and illustrated herein could be utilized without departing from the teachings of the invention.

Referring again to FIGS. 1, 2, and 6, the display unit 62, in turn, communicates this information, preferably electronically, to the microprocessor 60 via electrical lines 61. The display unit 62 may also include monitors to ensure correct operation of the planting apparatus, such as monitors to detect seed jams or other malfunctions in the seed dispensers (not illustrated), or operational speed alarms 64 capable of monitoring the ground speed of, e.g., the tractor as operated by the farmer to ensure that it is within the appropriate operational range of the planting apparatus 24, etc.

Referring to FIGS. 2, 3, and 4, operationally engaged with (and, in the illustrated embodiment, adjacent to) the hydraulic motor 42 in the described embodiment is an active speed sensor 50, which in turn communicates, preferably electronically, with the microprocessor 60 as well. In the illustrated embodiment, the active speed sensor 50 senses the rotational speed of the shaft 29 connected to the hydraulic motor 42 (which in turn determines, in part, the seed dispensing rate of the seed metering devices); however, it will be recognized in the art that the active speed sensor may be used to sense the rotational speed of other components directly or indirectly engaged with the hydraulic motor 42, for example, the shaft 22 or the rotating disc 14. One embodiment of an active speed sensor 50 known in the art and useful in carrying out the invention is a so-called Hall effect sensor wherein one or more magnets in the shaft 29 create a magnetic flux that results in an electrical pulse as the magnet rotates past the active speed sensor 50 (e.g., the Hall effect sensor), although other appropriate active speed sensors such as transducers may be used as well.

The active speed sensor 50 sends a signal to the microprocessor 60 which allows the microprocessor to determine whether the disc 14 is dispensing seeds 18 at the appropriate rate determined by the microprocessor to achieve proper linear seed spacing at the then-current operational speed of the planting apparatus 24 as determined via the ground speed sensor 26. If the microprocessor 60 determines that the rate of dispensing seeds 18 detected by the active speed sensor 50 is too fast (i.e., that the seeds are being dispensed too closely), then the microprocessor adjusts the flow of hydraulic fluid by sending an electronic signal proportionally closing the hydraulic proportional valve 44, thus slowing the hydraulic motor 42, the rotating shaft 22, rotating disc 14, and ultimately the seed dispensing rate. The converse would, of course, be true where the seed dispensing rate detected by the active speed sensor 50 is determined to be faster than appropriate.

The microprocessor 60 may take the form of microprocessors currently available from a number of manufacturers, such as the Motorola model no. MC68HC11EFN and serves to calculate the appropriate electrical signal to be provided to the hydraulic or distance travelled of the planting apparatus 24 as an input from the ground speed sensor 26 through the radar pre-amp 101 and the signal conditioning circuit 102, calculates the appropriate rate at which the hydraulic motor 42 should operate to cause the seed metering devices 12 to dispense seeds 18 at the desired intervals. A signal is then sent by the microprocessor 60 to the hydraulic proportional valve 44 to increase, decrease, or maintain the flow of hydraulic fluid therethrough in order to achieve the appropriate hydraulic motor speed.

The active speed sensor 50 operationally engaged with the hydraulic motor 42 ensures further accuracy and more responsive control by providing input to the microprocessor 60 as to whether the hydraulic motor 42 is in fact operating at the rate determined by the microprocessor; if it is not, the microprocessor 60 calculates the differential and sends a signal to the hydraulic proportional valve 44 to further increase or decrease the flow of hydraulic fluid, which in turn further refines the operating speed of the hydraulic motor 42 and the resultant seed dispensing rate and linear seed spacing.

Figure 9:
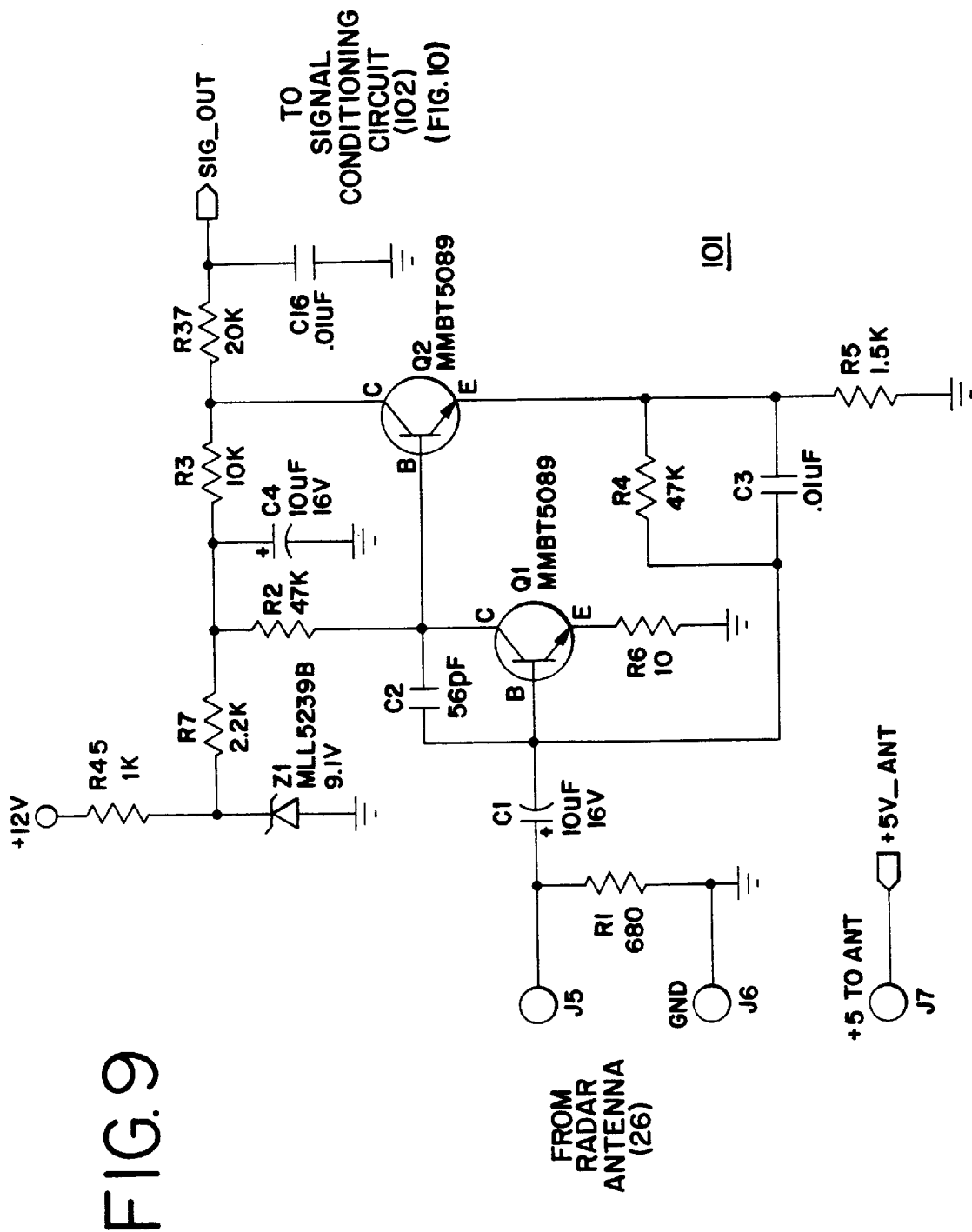
FIG. 9 is a schematic diagram of the electrical components of the radar pre-amp for the described embodiment.

As noted above, the ground speed sensor 26 provides a signal that is filtered via a signal conditioning circuit 102 (FIG. 10) after passing through the radar pre-amp 101 (FIG. 9). The radar pre-amp 101 is a pre-amp circuit such as that shown in FIG. 9. As will be recognized by those skilled in the art, other pre-amp circuits could be substituted for the circuit shown in FIG. 9 without departing from the teachings of the invention.

Figure 10:
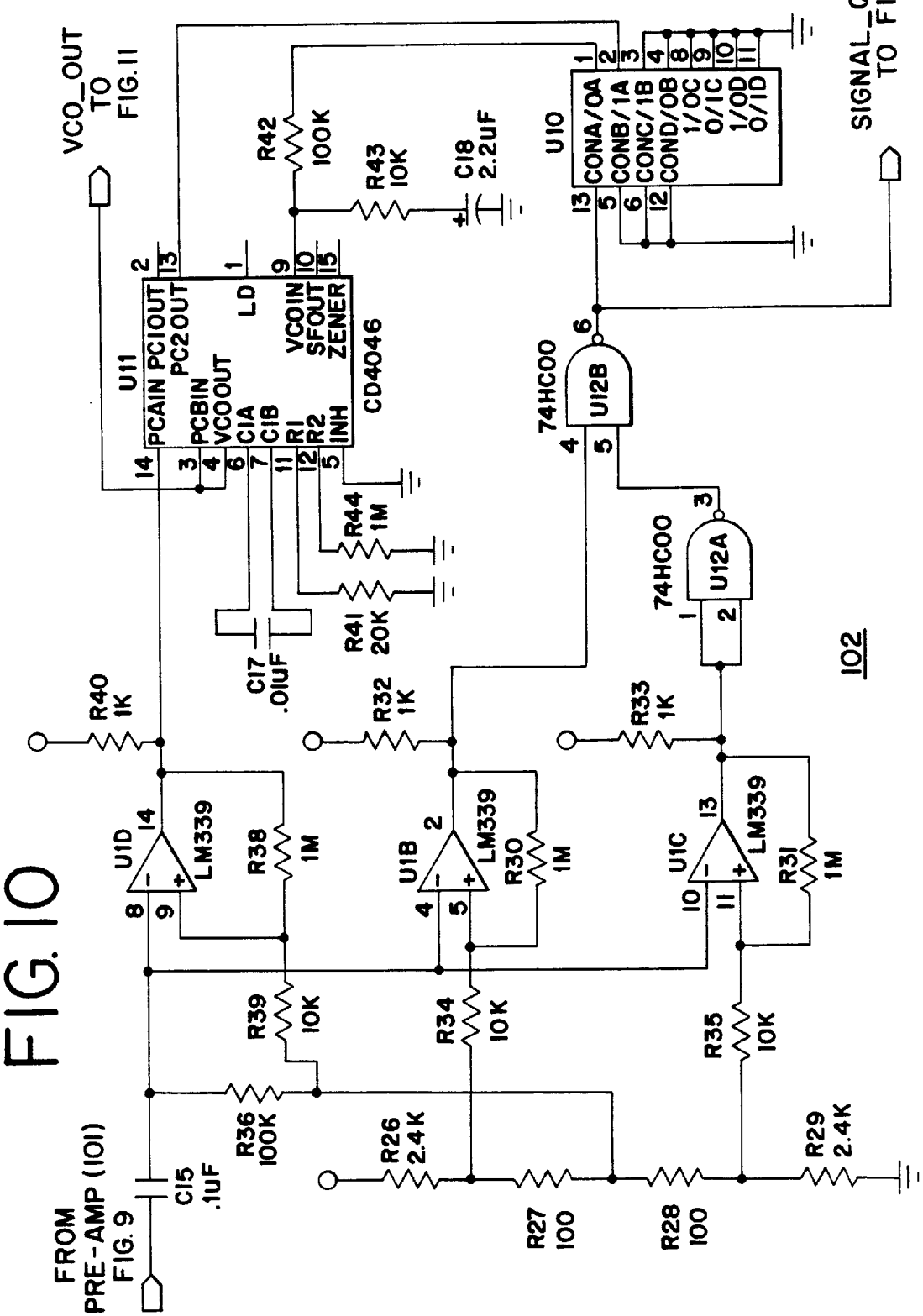
FIG. 10 is a schematic diagram of the electrical components of the signal conditioning circuit for the described embodiment.

A signal conditioning circuit 102, such as that shown in FIG. 10, is desirable to determine the ground speed or distance travelled with sufficient accuracy to achieve the goal of achieving accurate plant spacing over the operable range of planting apparatus 24, for example, in the described embodiment, over a range of plant spacings between 1 inch to 24 inches in ⅛ inch increments. Given that a typical K band radar antenna useful in low speed Doppler radars returns a substantially accurate signal frequency in the range near 72 Hz (per mile per hour of the moving vehicle), that means that at 0.1 mph, the low end of the described embodiment of the operational speed of the planting apparatus 24, the period of the signal would be 7.2 Hz. For a radar proportional valve 44 (and safety valve 45), which, in turn, determines the rate of hydraulic fluid passing through to the hydraulic motor 42, which in turn controls the rate of operation of the seed metering devices 12, which thereupon controls the linear spacing at which seeds 18 are dispensed to the field by the planting apparatus 24.

Because the microprocessor quickly and accurately correlates the rate at which seeds 18 are dispensed by the seed metering devices 12 to the ground, as well as the ground speed or distance travelled of the planting apparatus 24 as determined by the ground speed sensor 26 through the radar preamp 101 and the signal conditioning circuit 102, (i.e., ground speed is determined independent of wheel rotation, with the inherent slippage and sliding), the seeds are accurately and consistently dispensed at the predetermined plant spacing set by the farmer, and may be changed by the farmer "on the fly" via the display unit 62.

The microprocessor takes the selected linear spacing of the seeds that the farmer preselects (or changes) and inputs this information through the display unit 62, and using the relative ground speed unit to sample 10 waveforms under such circumstances would take 1.4 seconds. Because it would be preferable to sample more than 10 waveforms to obtain a statistically significant sample and achieve the accuracy and reliability desirable for the invention to carry out accurate seed planting, and because doing such sampling would result in separate samples being taken at intervals too infrequent to accurately control the rotational speed of the hydraulic motor, the signal conditioning circuit 102 such as that shown in FIG. 10 is desirable.

Moreover, the signal conditioning circuit 102 also aids in processing the radar signal to eliminate extraneous signal noise. For example, when the ground speed sensor 26 in the form of a low speed Doppler effect radar is mounted on a slow moving vehicle and pointed toward the ground, the return signal may be a composite signal that appears to be of constantly changing magnitude and symmetry, and which may result in periods of nearly complete signal cancellation, resulting intermittently in a return signal that may be loaded with extraneous signals unrelated to the ground speed or distance travelled. The desired return signal consists of multiple images of the same frequency which do relate to the speed of the vehicle, and hence, the distance travelled, even though such signals too vary in phase and magnitude. Those return signals truly related to the ground speed or distance travelled are selected by the signal conditioning circuit 102, as opposed to those signals unrelated to ground speed, with the signal conditioning circuit 102 adjusting for those occasions where the return signal fades or drops out altogether at intermittent intervals.

Prior to this invention, attempts to deal with the problems described above with low speed Doppler effect radar signals have involved the use of tracking filters or phase-locked loop circuits. While tracking filters may eliminate signals that are significantly out-of-band, they are less effective in dealing with the very low frequencies that would be associated with radars mounted on agricultural equipment, and are largely ineffective in reducing measurement uncertainty.

Phase-locked loops ("PLLs") are known in the art, and need not be described in detail here; PLLs typically utilize a Voltage Controlled Oscillator ("VCO"), a frequency/phase detector for generating an error or control signal, and a VCO control filter arranged in a closed-loop system. Such systems operate as frequency filters and may operate at very low frequencies; however, typical PLL implementations have a property that is very undesirable in connection with the invention. In the absence of a significant return signal, e.g., when a return signal from the radar intermittently fades, decreases in strength, or disappears, the PLL will migrate to the VCO center frequency or to the VCO's lowest operating frequency, and will transmit a signal accordingly. Thereafter, each time the radar return signal reappears, the PLL attempts to acquire a "lock" on that return signal, and this sometimes requires several signal periods. Frequently, the signal will fade or disappear again before the PLL can adequately lock on the signal. This results in the signal in the PLL migrating to varying degrees intermittently between the VCO frequency, which is not related to ground speed or distance travelled, and the return signal frequency; in the context of the invention, this would result in inaccurate rotational speed modulation for the rotating discs 14 in the seed metering devices 12. In other words, the rotational speed of the rotating discs 14 would migrate intermittently as well due to the PLL's signal migration, resulting in inaccurate linear plant spacing.

Figure 15:
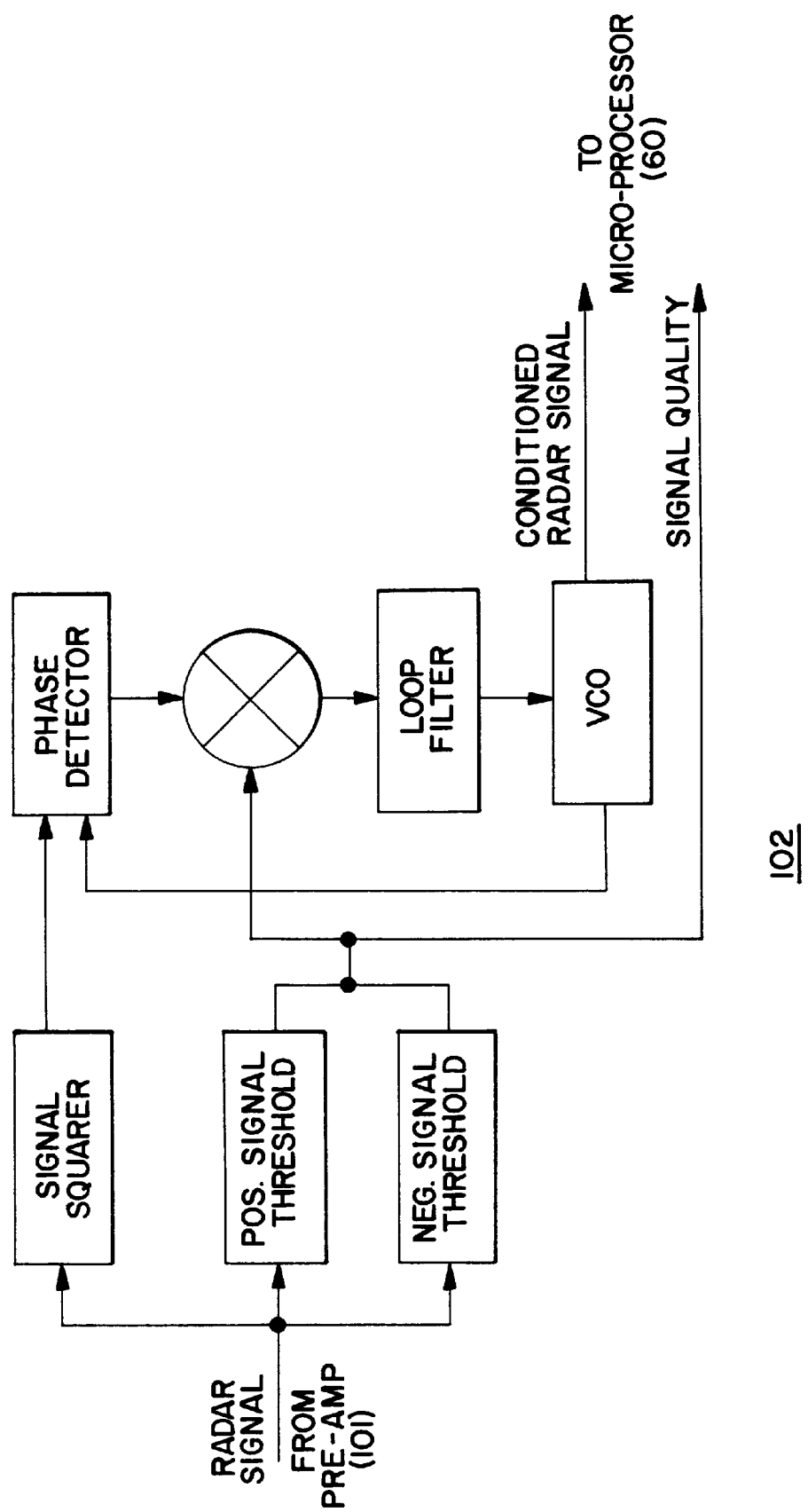
FIG. 15 is a functional block diagram schematic of the signal conditioning circuit.
Figure 16:
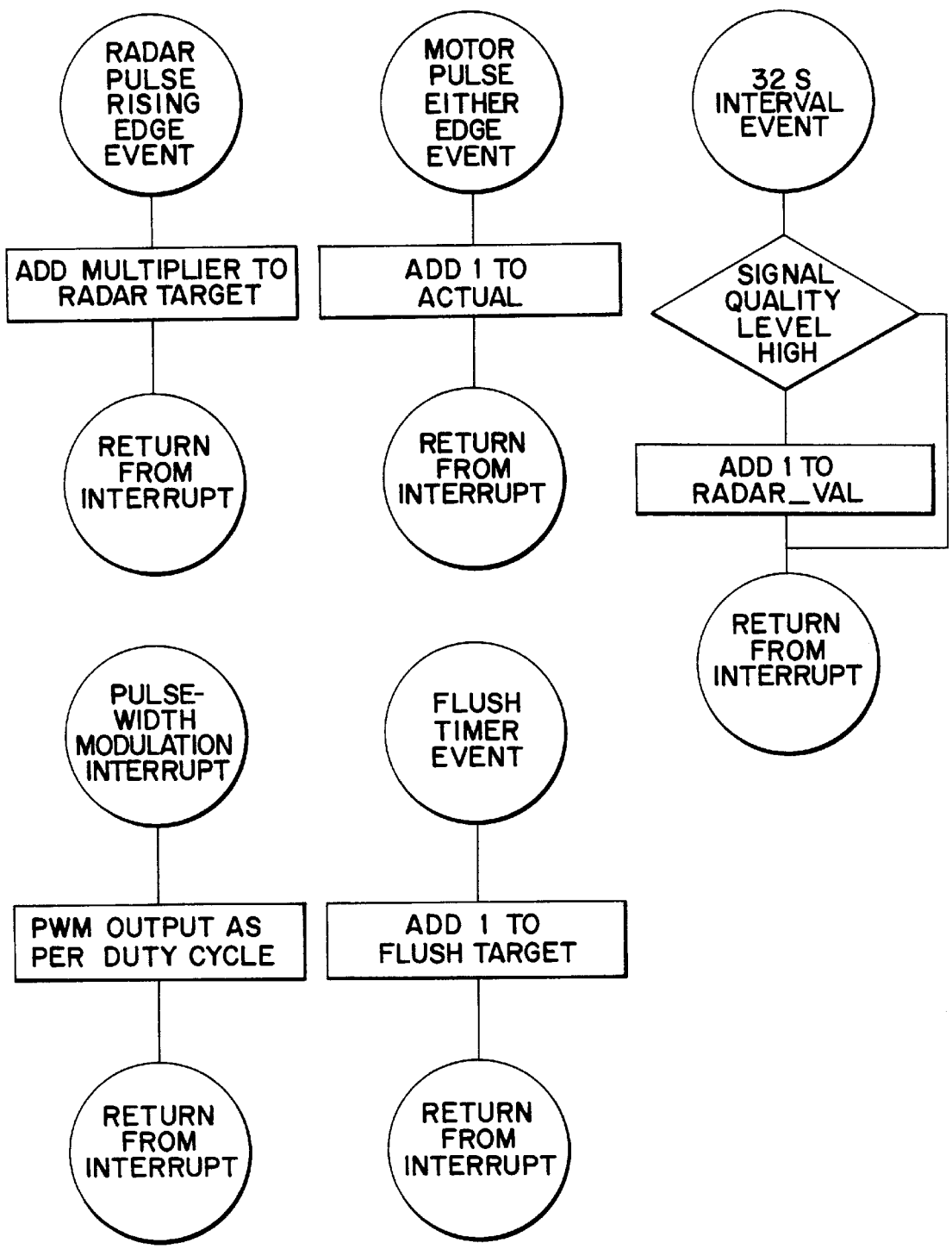
FIG. 16 is a flow chart schematic of the computer logic for background functions accessed by the main program of the microprocessor via interrupts.

The signal conditioning circuit 102, shown in detail in FIG. 10 and in functional block diagram form in FIG. 15, provides a unique circuit arrangement within a PLL circuit such that the radar return signal only influences the VCO while the return signal is adequate in magnitude; when the return signal is inadequate (e.g., when it intermittently fades or disappears), the PLL remains at its last locked frequency (i.e., it does not migrate) until adequate return signal strength is again detected. The output from the signal conditioning circuit 102 thus constitutes a much more stable image with only minor corrections occurring at any given instant. A secondary output signal from this signal conditioning circuit varies in duration relative to the period (duty cycle) with the magnitude of the radar signal and is used as a signal quality indication. The stable output signals from the signal conditioning circuit, the inventors have found, permits the measurement of ground speed between at least 0.10 and 12.0 mph, with an accuracy of plus or minus 0.01 mph, therefore permitting accurate calibration of seed placement to within 0.125 inches or less in connection with the invention described herein.

Referring to FIGS. 8A, 8B, 8C, 8D, 8E, 9, 10, 13 and 15, the return signal from the ground speed sensor 26 (the Doppler effect radar in the described embodiment) via the radar pre-amp 101 passes through the signal conditioning circuit 102, which includes a signal squaring circuit that ignores or effectively filters low level noise signals and presents a clear square wave to the phase detector. The return signal is also directed through two signal magnitude threshold comparators, with the outputs combined to gate the phase detector output to the loop filter when the absolute value of the return signal is above a predetermined level. The loop filter then controls the VCO frequency so that it will consistently be the average value of the return signal, which has been validated through the foregoing signal conditioning procedure.

The combined output of the signal magnitude threshold comparators varies in duration relative to the period (duty cycle) with the magnitude of the return signal, which is used by the microprocessor 60 as a signal quality indicator.

The output signal of the signal conditioning circuit may be treated as a ground speed measurement, and integrated by one or more known means to determine distance travelled; however, the inventors have found it advantageous to treat the output signal as a progressive position measurement. For example, where the period of a radar signal is approximately 72 Hz (actually, a return signal of 71.9486 Hz) per mile per hour of the moving vehicle, that equates to a distance travelled of approximately 0.24462 inches per return signal cycle. ((1 mile/hour)×(1 hour/3600 seconds) ×(5280 feet/1 mile)×(12 inches/1 foot)×(1 second/71.9486 cycles)= 0.24462 inches/cycle). By accumulating radar return signal pulses, the distance travelled can be determined by direct proportionality. Similarly, the rotational speed of, e.g., the rotating discs 14 as determined by the active speed sensor 50 can be determined in terms of rotational speed; however, the inventors have found it advantageous to treat that signal as a mechanism position signal. Because the pulses of the active speed sensor 50 may be recognized on both the rising and falling portions of the pulse, the frequency with which the active speed sensor 50 provides position information is effectively doubled.

Referring to FIGS. 3, 4, 5, 6, 14, and 16, microprocessor 60 uses the signals obtained from the signal conditioning circuit 102 and from the active speed sensor 50 in order to regulate the speed of the hydraulic motor 42 such that the seeds 18 are dispensed at the desired spacing as input through the plant spacing inputs 62. It will be recognized that for a desired seed spacing, and for a given number of holes 16 in the rotating discs 14, there exists a mathematical relationship between the pulses of the return signal from the ground speed sensor 26 and the pulses from the active speed sensor 50, and the number (or fraction of the number) of seeds 18 dispensed. The microprocessor 60 accumulates the pulses of the return signal of ground speed sensor 26 for the signal conditioning circuit 102 and compares the pulses of the active speed sensor 50 (based upon the plant spacing input), and to the extent that the rotational speed of the rotating disc is not appropriate to achieve the desired plant spacing at the then-current operational ground speed of the planting apparatus 24, the microprocessor 60 corrects the speed of the hydraulic motor 42 by sending a signal to adjust the hydraulic proportional valve 44 accordingly, as previously described.

For a given sampling period, the mathematical relationship between the signal received via the ground speed sensor 26 and the active speed sensor 50 utilized to correct the rotational speed of the hydraulic motor 42 by proportionally opening or closing the hydraulic proportional valve 44 may be expressed generally as follows: (Number Of Target Radar Return Pulses)/(Number Of Target Active Speed Sensor Pulses)=((Desired Seed Spacing (in.))/(0.22462 in. per pulse))×((Number Of Holes In Rotating Disc)/(Number Of Pulses Generated Per Revolution Of The Rotating Disc)). (The 0.22462 inch figure used in connection with the described embodiment of the invention represents the period of a 71.9486 Hz signal, the return signal for the radar per mile per hour travelled. Those skilled in the art will recognize that, for different embodiments of the invention, for example, using a different effective return signal, this figure might have to be adjusted without departing from the teachings of the invention.)

Thus, for any given setting for the planting apparatus 24, and for a desired seed spacing selected by the farmer, the ratio between the Number Of Target Radar Return Pulses to the Number Of Target Active Speed Sensor Pulses Generated Per Revolution Of The Rotating Disc can be seen to be a constant ($K_T$). For example, if the planting apparatus is set up to generate 190 pulses per revolution of the shaft 29 (and, consequently, the disc 14), and assuming that there are 6 holes 16 in the disc 14, and assuming that the farmer desires to plant at 6 inch spacing, the ratio between the Number of Target Radar Return Pulses to the Number Of Target Active Speed Sensor Pulses Generated Per Revolution Of The Rotating Disc or $K_T$ would be equal to ((6 in. per plant)/ (0.22462 in. per pulse))×((6 holes (plants) per revolution)/ (190 pulses per revolution))=0.84353. This constant is recalculated by the microprocessor 60 whenever the planting apparatus starts, or the desired seed spacing or the number of holes 16 in disc 14 is changed.

Each time that a pulse is generated as a result of a return signal from the ground speed sensor 26, the constant $K_T$ is added into an internal register in the microprocessor 60. Each time a pulse is generated by the active speed sensor 50, a unity value (1) is added into an internal register in the microprocessor 60. These tasks are performed in the background of the main program of the microprocessor 60 through the use of interrupts. In the described embodiment, each pass through the program loop (every 4.096 mS) the microprocessor 60 determines the difference between the two registers (effectively, the target number of pulses minus the actual number of pulses), and multiplies that difference by a gain factor; it then outputs that product as the pulse width modulation ("PWM") duty cycle for the hydraulic proportional valve 44. The task of controlling the output is also performed in the background of the main program, using interrupts. The rotating speed of the hydraulic motor 42 and, hence, the shaft 29 and the disc 14, is adjusted by the microprocessor 60 in the above-described manner to generate a signal to the hydraulic proportional valve 44 so that the accumulated values in the two registers match.

The combined output of the signal magnitude threshold comparators into the microprocessor 60 is caused to increment a register while the signal level is high. This task is performed in the background using interrupts. At intervals, the main program acquires this value, clears the register for evaluation over the next interval, and divides it by the maximum possible register value. This result is used as a signal quality factor for validating the presence of the return signal from the ground speed sensor 26.

In order that the planting apparatus 24 starts and stops planting seed coincident with the starting and stopping of movement of the planting apparatus 24, the microprocessor 60 senses: (1) when the planting apparatus 24 has begun moving positively relative to the ground, and then sends signals opening the safety valve 45 and/or the hydraulic proportional valve 44; (2) when the planting apparatus 24 has ceased moving positively relatively to the ground, and then sends signals closing the safety valve 45 and/or the hydraulic proportional valve 44; and (3) when no useable return signals are available from the radar for a prolonged period of time, in which case the microprocessor 60 sends signals closing the safety valve 45 and/or the hydraulic proportional valve 44. When the microprocessor 60 sends a signal closing the safety valve 45 and/or the hydraulic proportional valve 44, it may also optionally send another signal, e.g., to the display unit 62 indicating that planting has stopped.

Figure 11:
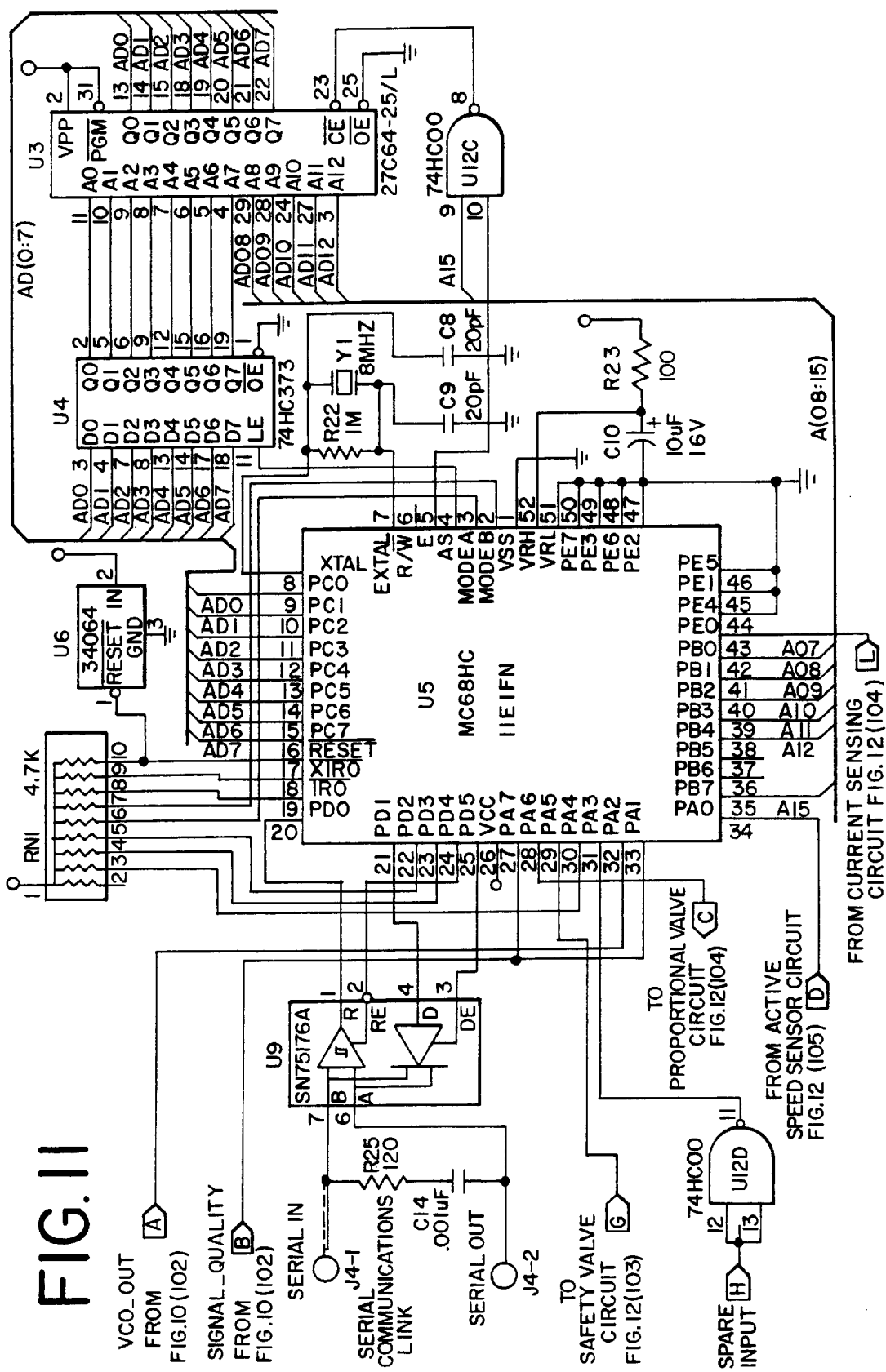
FIG. 11 is a schematic diagram of the electrical components, isolating those components most directly associated with the microprocessor, and illustrating electrical communications between the microprocessor and other electrical components with which it communicates in the described embodiment.
Figure 12:
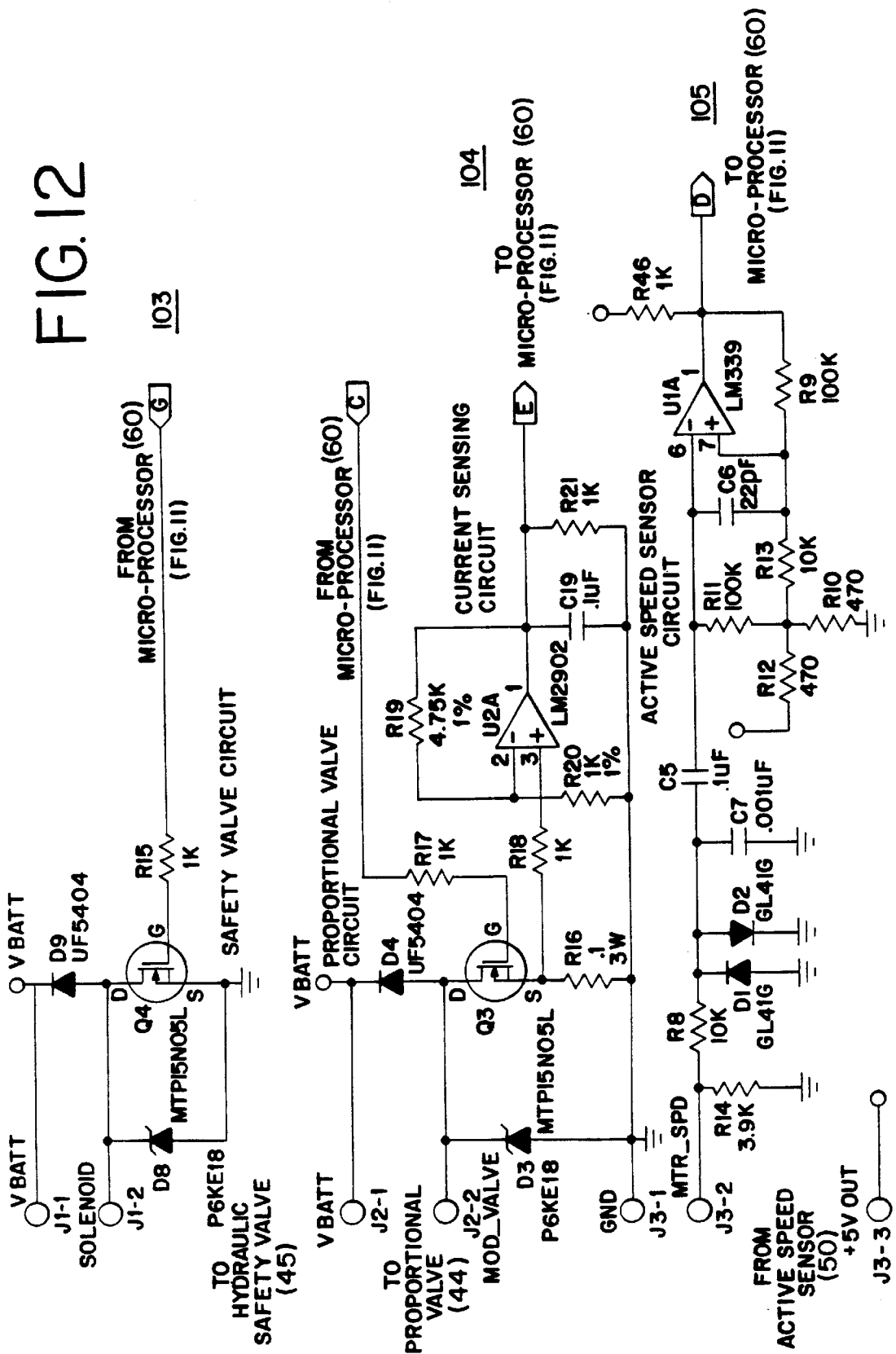
FIG. 12 is a schematic diagram of the electrical components for the input and output circuits between the microprocessor and other electrical/mechanical components with which it communicates in the described embodiment.
Figure 13:
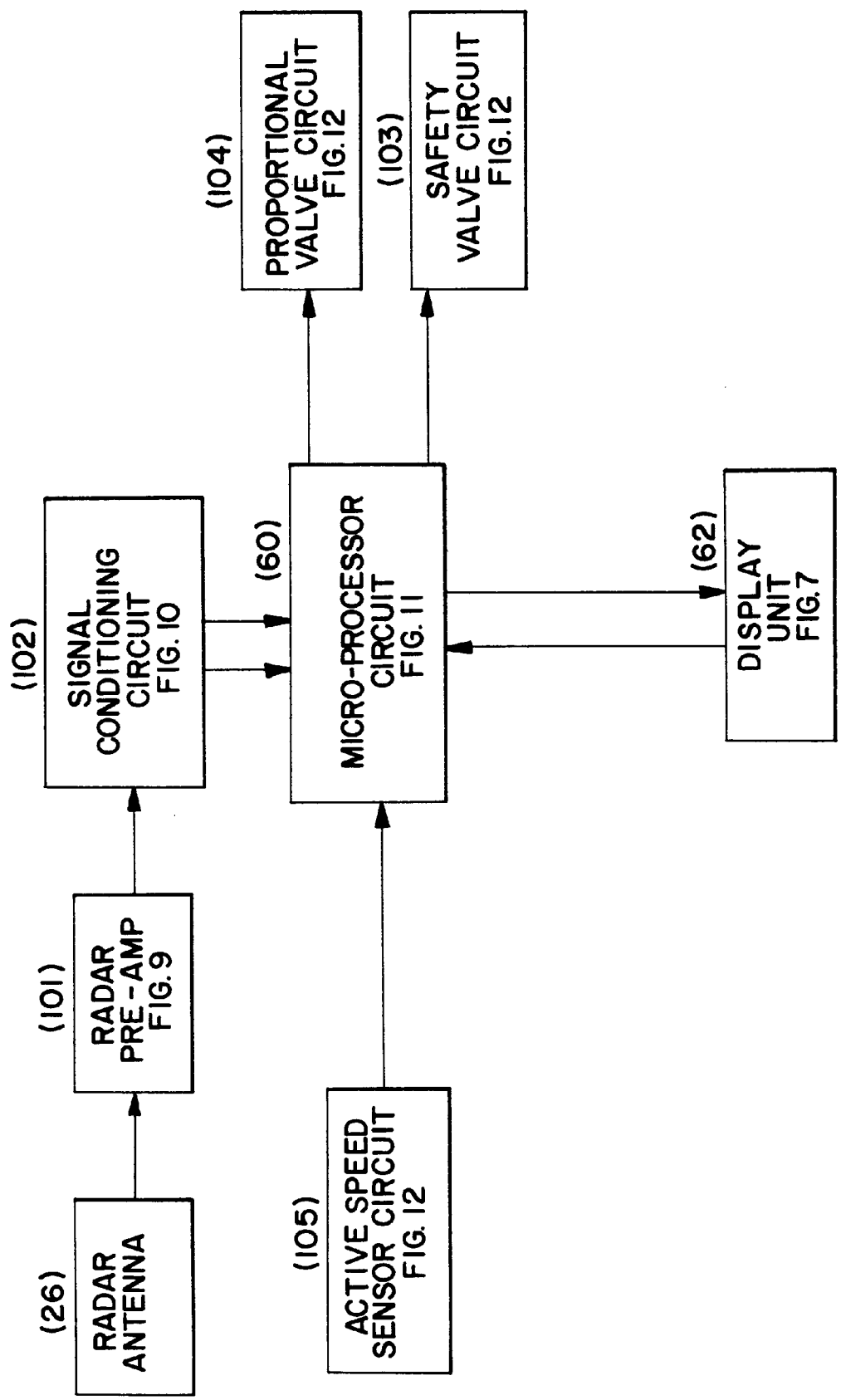
FIG. 13 is a block diagram illustrating the electrical systems in the described embodiment, and the electrical communications between those electrical systems.
Figure 14:
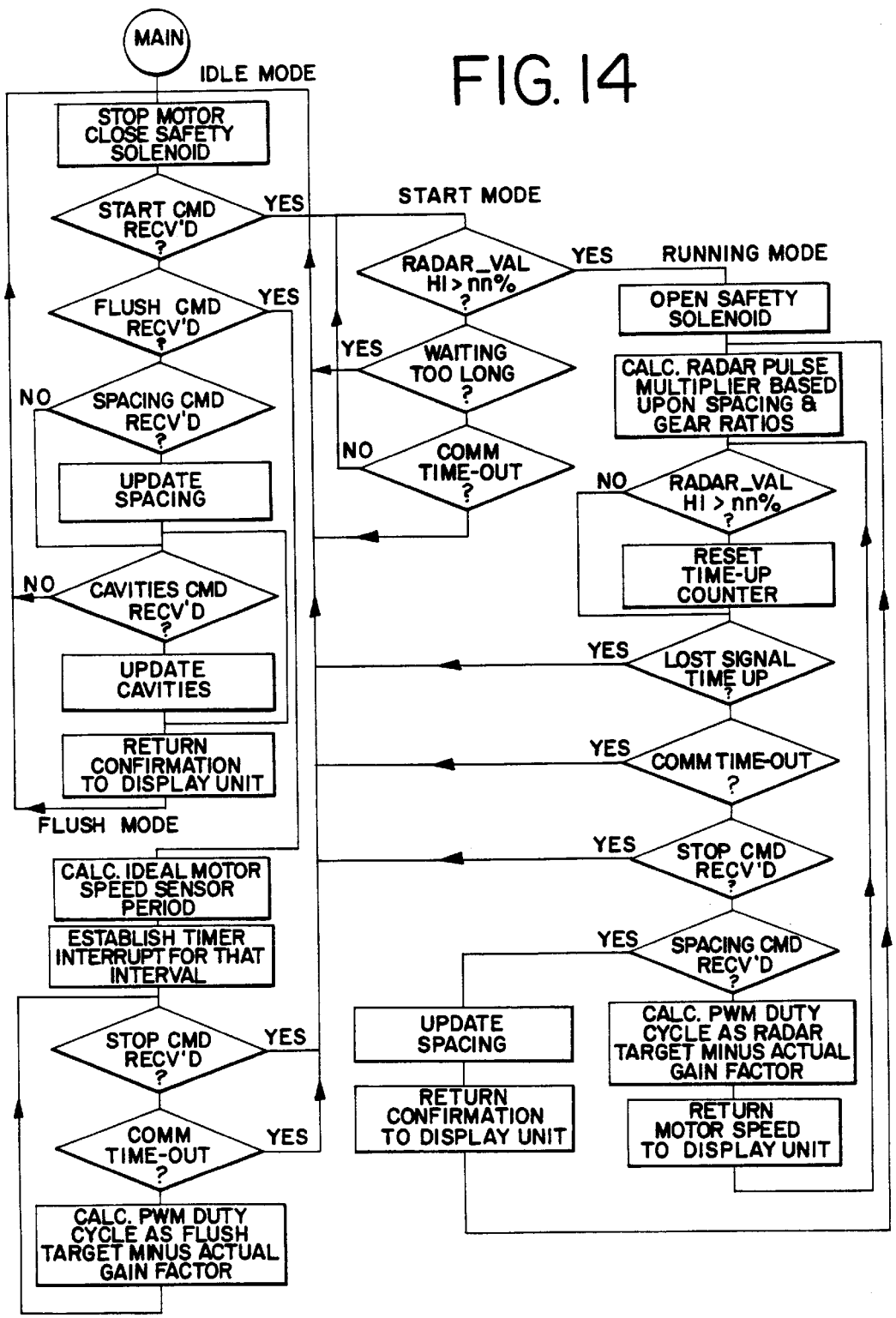
FIG. 14 is a flow chart schematic for the microprocessor, illustrating generally the logic of the computer code utilized in conjunction with the described embodiment.

Referring to FIGS. 11, 12, and 13 in the described embodiment, the microprocessor 60 signals the hydraulic proportional valve 44 by causing the output via the hydraulic proportional valve output circuit 104 to be a PWM signal with a frequency of around 1 KHz and the duty cycle varied as required. The output circuitry for the hydraulic proportional valve 44 and the safety valve 45 (circuits 104 and 103, respectively), are similar, except that the hydraulic proportional valve output circuit 104 includes a current sensing shunt resistor in order to permit the microprocessor 60 to monitor the valve current. Both output circuits utilize N-channel Field Effect Transistors ("FETs") for low-side switching of the valves. The active speed sensor input circuit 105 utilizes a hysteresis comparator to square up the signal and reduce the effect of electrical noise. Those skilled in the art will recognize that input/output circuits other than those specifically illustrated and discussed herein can be utilized without departing from the teachings of the invention.

For purposes of describing a specific embodiment of the invention, the following includes an exemplary program for the microprocessor 60 of this invention, reproduced as a source statement, including comments as appropriate.

Many other objects, features and advantages of the invention will be more fully realized and understood from the foregoing detailed description when taken in conjunction with the accompanying drawings wherein like reference numerals throughout the various drawings are intended to designate similar elements and components.

What is claimed is:

1. The combination of a Doppler effect radar and a signal conditioning circuit, wherein said signal conditioning circuit comprises a magnitude threshold comparator and a phase-locked loop, and wherein the low-frequency radar return signal continuously influences the voltage controlled oscillator when said return signal is above a prescribed threshold magnitude.

2. The combination of a low speed Doppler effect radar and a signal conditioning circuit of claim 1, wherein said signal conditioning circuit further comprises:

(A) a phase-locked loop including a phase detector, a loop filter, and a voltage controlled oscillator; and (B) an electronic circuit for maintaining the operating frequency of the voltage controlled oscillator at its last locked frequency in the event that the return signal from the Doppler effect radar falls below a prescribed threshold magnitude.

3. The combination of a low speed Doppler effect radar and a signal conditioning circuit of claim 2 wherein said signal conditioning circuit further comprises:

(A) an electronic signal squaring circuit in electronic communication with said Doppler effect radar; and (B) positive and negative signal magnitude threshold comparator circuits, with the outputs of said threshold comparator circuits combined to gate the phase detector output to a loop filter when the absolute value of the return signal so conditioned is above a predetermined level, and in electronic communication with said voltage controlled oscillator via said loop filter, and wherein said loop filter controls the frequency of said voltage controlled oscillator.

4. The combination of a low speed Doppler effect radar and a signal conditioning circuit of claim 1 wherein said phase-locked loop, when said return signal is below a prescribed threshold magnitude, remains at its last locked frequency until said return signal rises above said prescribed threshold magnitude.

5. The combination of a low speed Doppler effect radar and a signal conditioning circuit of claim 1 wherein said signal conditioning circuit further comprises a secondary periodic output signal of a duty cycle varying with the magnitude of said return signal.

6. The combination of a low speed Doppler effect radar and a signal conditioning circuit of claim 1 wherein said return signal is directed through two or more signal magnitude threshold comparators, with the outputs of said comparators combined to gate the phase detector circuit output to the loop filter whenever the magnitude of said return signal is above said certain prescribed magnitude.

* * * * *